(12) United States Patent
Ovadia et al.

(10) Patent No.: US 7,298,973 B2
(45) Date of Patent: Nov. 20, 2007

(54) ARCHITECTURE, METHOD AND SYSTEM OF MULTIPLE HIGH-SPEED SERVERS TO NETWORK IN WDM BASED PHOTONIC BURST-SWITCHED NETWORKS

(75) Inventors: Shlomo Ovadia, San Jose, CA (US); Christian Maciocco, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 800 days.

(21) Appl. No.: 10/417,823

(22) Filed: Apr. 16, 2003

(65) Prior Publication Data

US 2004/0208171 A1 Oct. 21, 2004

(51) Int. Cl.
*H04J 14/00* (2006.01)

(52) U.S. Cl. .............................. 398/49; 398/45; 398/50; 398/51; 398/47; 398/48; 398/54; 398/58; 370/389; 370/468; 370/395.2; 370/396; 370/360; 713/201

(58) Field of Classification Search .................. 398/49, 398/50, 51, 45, 47, 48, 54, 58; 370/360, 370/396, 395.2, 468, 389; 713/201
See application file for complete search history.

(56) References Cited

U.S. PATENT DOCUMENTS

| | | | |
|---|---|---|---|
| 4,663,748 A | 5/1987 | Karbowiak et al. | |
| 5,235,592 A | 8/1993 | Cheng et al. | |
| 5,331,642 A | 7/1994 | Valley et al. | |
| 5,457,556 A | 10/1995 | Shiragaki | |
| 5,506,712 A | 4/1996 | Sasayama et al. | |
| 5,550,803 A | 8/1996 | Crayford et al. | |
| 5,559,796 A | 9/1996 | Edem et al. | |
| 5,646,943 A | 7/1997 | Elwalid | |
| 5,768,274 A * | 6/1998 | Murakami et al. | 370/395.7 |
| 5,838,663 A | 11/1998 | Elwalid et al. | |
| 5,970,050 A | 10/1999 | Johnson | |

(Continued)

FOREIGN PATENT DOCUMENTS

CN     1384618     12/2002

(Continued)

OTHER PUBLICATIONS

Jacob et al., "Delay Performance of Some Scheduling Strategies in an Input Queuing ATM with Multiclass Bursty Traffic," IEEE/ACM Transactions on Networking, vol. 4, No. 2, Apr. 1996, pp. 258-271.

(Continued)

*Primary Examiner*—Hanh Phan
(74) *Attorney, Agent, or Firm*—Blakely, Sokoloff, Taylor & Zafman LLP

(57) ABSTRACT

A modular reconfigurable multi-server system for use in a wavelength-division-multiplexed based photonic burst switched (PBS) network with variable time slot provisioning. An optical high-speed I/O module within the multi-server system enables it to serve as an edge node in the PBS network. The optical I/O module statistically multiplexes the incoming packets (e.g., IP packets or Ethernet frames) received from a legacy network, generates control and data bursts, which are then scheduled for transmission over the PBS network. The optical I/O module then optically transmits and receives the scheduled optical bursts according to traffic priority and available network resources.

71 Claims, 12 Drawing Sheets

U.S. PATENT DOCUMENTS

| | | | |
|---|---|---|---|
| 5,978,356 A | 11/1999 | Elwalid et al. | |
| 6,111,673 A | 8/2000 | Chang et al. | |
| 6,222,839 B1 | 4/2001 | Nakazaki et al. | |
| 6,260,155 B1 | 7/2001 | Dellacona | |
| 6,271,946 B1 | 8/2001 | Chang et al. | |
| 6,272,117 B1 | 8/2001 | Choi et al. | |
| 6,325,636 B1 | 12/2001 | Hipp et al. | |
| 6,339,488 B1 | 1/2002 | Beshai et al. | |
| 6,400,863 B1 | 6/2002 | Weinstock et al. | |
| 6,411,506 B1 | 6/2002 | Hipp et al. | |
| 6,466,586 B1 | 10/2002 | Darveau et al. | |
| 6,487,686 B1 | 11/2002 | Yamazaki et al. | |
| 6,490,292 B1 | 12/2002 | Matsuzawa | |
| 6,498,667 B1 | 12/2002 | Masucci et al. | |
| 6,519,062 B1 | 2/2003 | Yoo | |
| 6,519,255 B1 | 2/2003 | Graves | |
| 6,525,850 B1 | 2/2003 | Chang et al. | |
| 6,542,499 B1 | 4/2003 | Murphy et al. | |
| 6,545,781 B1 | 4/2003 | Chang et al. | |
| 6,603,893 B1 | 8/2003 | Liu et al. | |
| 6,615,382 B1 | 9/2003 | Kang et al. | |
| 6,665,495 B1 | 12/2003 | Miles et al. | |
| 6,671,256 B1* | 12/2003 | Xiong et al. | 370/230 |
| 6,674,558 B1 | 1/2004 | Chang et al. | |
| 6,690,036 B2 | 2/2004 | Liu et al. | |
| 6,697,374 B1 | 2/2004 | Shraga et al. | |
| 6,721,271 B1 | 4/2004 | Beshai et al. | |
| 6,721,315 B1 | 4/2004 | Xiong et al. | |
| 6,839,322 B1 | 1/2005 | Smith | |
| 6,842,424 B1 | 1/2005 | Key et al. | |
| 6,873,797 B2 | 3/2005 | Chang et al. | |
| 6,898,205 B1 | 5/2005 | Chaskar et al. | |
| 6,925,257 B2* | 8/2005 | Yoo | 398/47 |
| 6,940,863 B2 | 9/2005 | Xue et al. | |
| 6,956,868 B2 | 10/2005 | Qiao | |
| 6,987,770 B1 | 1/2006 | Yonge, III | |
| 6,990,071 B2 | 1/2006 | Adam et al. | |
| 7,023,846 B1 | 4/2006 | Andersson et al. | |
| 7,035,537 B2 | 4/2006 | Wang et al. | |
| 7,092,633 B2 | 8/2006 | Fumagalli et al. | |
| 7,106,968 B2 | 9/2006 | Lahav et al. | |
| 2002/0018263 A1 | 2/2002 | Ge et al. | |
| 2002/0018468 A1 | 2/2002 | Nishihara | |
| 2002/0023249 A1 | 2/2002 | Temullo et al. | |
| 2002/0024700 A1 | 2/2002 | Yokoyama et al. | |
| 2002/0027686 A1 | 3/2002 | Wada et al. | |
| 2002/0063924 A1 | 5/2002 | Kimbrough et al. | |
| 2002/0109878 A1 | 8/2002 | Qiao | |
| 2002/0118419 A1 | 8/2002 | Zheng et al. | |
| 2002/0126337 A1 | 9/2002 | Uematsu et al. | |
| 2002/0141400 A1 | 10/2002 | DeMartino | |
| 2002/0150099 A1 | 10/2002 | Pung et al. | |
| 2002/0154360 A1* | 10/2002 | Liu | 359/135 |
| 2002/0159114 A1 | 10/2002 | Sahasrabuddhe et al. | |
| 2002/0186695 A1 | 12/2002 | Schwartz et al. | |
| 2002/0188433 A1 | 12/2002 | Mishra | |
| 2002/0196808 A1 | 12/2002 | Karri et al. | |
| 2003/0002499 A1 | 1/2003 | Cummings et al. | |
| 2003/0009582 A1 | 1/2003 | Qiao et al. | |
| 2003/0016411 A1 | 1/2003 | Zhou et al. | |
| 2003/0031198 A1 | 2/2003 | Currivan et al. | |
| 2003/0037297 A1 | 2/2003 | Araki | |
| 2003/0039007 A1 | 2/2003 | Ramadas et al. | |
| 2003/0043430 A1 | 3/2003 | Handelman | |
| 2003/0048506 A1 | 3/2003 | Handelman | |
| 2003/0053475 A1 | 3/2003 | Veeraraghavan et al. | |
| 2003/0067880 A1 | 4/2003 | Chiruvolu | |
| 2003/0099243 A1 | 5/2003 | Oh et al. | |
| 2003/0120799 A1 | 6/2003 | Lahav et al. | |
| 2003/0189933 A1 | 10/2003 | Ozugur et al. | |
| 2003/0198471 A1 | 10/2003 | Ovadia | |
| 2003/0214979 A1 | 11/2003 | Kang et al. | |
| 2004/0004966 A1 | 1/2004 | Foster et al. | |
| 2004/0052525 A1 | 3/2004 | Ovadia | |
| 2004/0062263 A1 | 4/2004 | Charcranoon et al. | |
| 2004/0120261 A1 | 6/2004 | Ovadia | |
| 2004/0131061 A1 | 7/2004 | Matsuoka et al. | |
| 2004/0156325 A1 | 8/2004 | Perkins et al. | |
| 2004/0156390 A1 | 8/2004 | Prasad et al. | |
| 2004/0170165 A1 | 9/2004 | Maciocco et al. | |
| 2004/0170431 A1 | 9/2004 | Maciocco et al. | |
| 2004/0208171 A1 | 10/2004 | Ovadia et al. | |
| 2004/0208172 A1* | 10/2004 | Ovadia et al. | 370/360 |
| 2004/0208544 A1 | 10/2004 | Ovadia | |
| 2004/0208554 A1 | 10/2004 | Wakai et al. | |
| 2004/0234263 A1 | 11/2004 | Ovadia et al. | |
| 2004/0252995 A1 | 12/2004 | Ovadia et al. | |
| 2004/0258407 A1 | 12/2004 | Maciocco et al. | |
| 2004/0264960 A1 | 12/2004 | Maciocco et al. | |
| 2005/0030951 A1 | 2/2005 | Maciocco et al. | |
| 2005/0063701 A1 | 3/2005 | Ovadia et al. | |
| 2005/0068968 A1 | 3/2005 | Ovadia et al. | |
| 2005/0068995 A1 | 3/2005 | Lahav et al. | |
| 2005/0089327 A1 | 4/2005 | Ovadia et al. | |
| 2005/0105905 A1 | 5/2005 | Ovadia et al. | |
| 2005/0152349 A1 | 7/2005 | Takeuchi et al. | |
| 2005/0175183 A1 | 8/2005 | Ovadia et al. | |
| 2005/0175341 A1 | 8/2005 | Ovadia | |
| 2005/0177749 A1 | 8/2005 | Ovadia | |
| 2005/0259571 A1 | 11/2005 | Battou | |
| 2006/0008273 A1 | 1/2006 | Xue et al. | |

FOREIGN PATENT DOCUMENTS

| | | |
|---|---|---|
| CN | 1406000 | 3/2003 |
| CN | 1426189 | 6/2003 |
| EP | 0876076 | 11/1998 |
| EP | 1 073 306 A | 1/2001 |
| EP | 1 073 307 A2 | 1/2001 |
| EP | 1 089 498 A2 | 4/2001 |
| EP | 1122971 | 8/2001 |
| EP | 1135000 | 9/2001 |
| EP | 1217862 | 6/2002 |
| EP | 1 351 458 A1 | 10/2003 |
| WO | WO 01/19006 | 3/2001 |
| WO | WO 01/67694 A1 | 9/2001 |
| WO | WO 01/76160 A1 | 10/2001 |
| WO | WO 01/86998 A | 11/2001 |
| WO | WO 02/41663 A2 | 5/2002 |
| WO | WO 02/067505 | 8/2002 |
| WO | PCT/US2004/007633 | 10/2004 |

OTHER PUBLICATIONS

Yoo et al., "Optical Burst Switching for Service differentiation in the Next-Generation Optical Internet," IEEE, Feb. 2001, pp. 98-104.

Guillemot et al., "Transparent Optical Packet Switching: The European ACTS KEOPS Project Approach," IEEE, Journal of Lightwave Technology, vol. 16, No. 12, Dec. 1998, pp. 2117-2126.

Gambini et al., "Transparent Optical Packet Switching: Network Architecture and Demonstrators in the KEOPS Project," IEEE Journal of Selected Areas in Communications, vol. 16, No. 7, Sep. 1998, pp. 1245-1259.

Mehorta, Pronita, et al., "Network Processor Design for Optical Burst Switched Networks," Proceedings of the 14th Annual IEEE International ASIC/SOC Conference, Sep. 12-15, 2001, pp. 296-300.

Ovadia, Shlomo et al., "Photonic Burst Switching (PBS) Architecture for Hop and Span-Constrained Optical Networks," IEEE Optical Communications, vol. 41, No. 11, Nov. 2003, pp. S24-S32.

Office Action mailed on Jan. 12, 2007. U.S. Appl. No. 10/242,839, filed Sep. 13, 2002, Ovadia et al.

Office Action mailed on Mar. 21, 2007. U.S. Appl. No. 10/713,585, filed Nov. 13, 2002, Ovadia et al.

Final Office Action mailed on Jan. 17, 2007. U.S. Appl. No. 10/606,323, filed Jun. 24, 2003, Maciocco et al.

Final Office Action mailed on Feb. 9, 2007. U.S. Appl. No. 10/373,312, filed Feb. 28, 2003, Maciocco et al.

Non-Final Office Action mailed on Feb. 20, 2007. U.S. Appl. No. 10/377,580, filed Feb. 28, 2003, Maciocco et al.

Office Action mailed on Dec. 29, 2006. Ovadia et al., "Modular Reconfigurable Multi-Server System and Method for High-Speed Networking Within Photonic Burst-Switched Networks," U.S. Appl. No. 10/418,487, filed Apr. 17, 2003.

Office Action mailed on Jan. 3, 2007. Ovadia et al., "Method and System to Recover Resources in the Event of Data Burst Loss Within WDM-Based Optical-Switched Networks," U.S. Appl. No. 10/668,874, filed Sep. 23, 2003.

Office Action mailed on Jan. 10, 2007. Maciocco et al., "Generic Multi-Protocol Label Switching (GMPLS) Signaling Extensions for Optical Switched Networks," U.S. Appl. No. 10/636,062, filed Aug. 6, 2003.

Ghani, Nasir et al., "On IP-over-WDM Integration", IEEE Communications Magazine, Mar. 2000, pp. 72-84.

Yoo, S.J. Ben, "Optical-label switching, MPLS, MPLambdaS, and GMPLS", Optical Networks Magazine, May/Jun. 2003, pp. 17-31.

Rekhter, Y. et al, "A Border Gateway Protocol 4 (BGP-4)", Network Working Group, Mar. 1995, pp. 1-57.

Cao, Xiaojun et al., "Assembling TCP/IP Packets in Optical Burst Switched Networks", IEEE Global Telecommunications Conference, New York, 2002, vol. 1, pp. 2808-2812.

Wang, S.Y., "Using TCP Congestion Control to Improve the Performance of Optical Burst Switched Networks", IEEE International Conference on Communications, Taiwan, 2003, pp. 1438-1442.

Detti, Andrea et al., "Impact of Segments Aggregation on TCP Reno Flows in Optical Burst Switching Networks", IEEE Infocom, New York , 2002, vol. 1, pp. 1803-1805.

Ovadia et al., "Dynamic Route Discovery for Optical Switched Networks," U.S. Appl. No. 10/691,712, filed Oct. 22, 2003, Office Action mailed on Nov. 14, 2006.

Ovadia et al., "Architecture and Method for Framing Optical Control and Data Bursts Within Optical Transport Unit Structures in Photonic Burst-Switched Networks," U.S. Appl. No. 10/441,771, filed May 19, 2003, Office Action mailed on Nov. 15, 2006.

Maciocco et al., "Adaptive Framework for Closed-Loop Protocols Over Photonic Burst Switched Networks," U.S. Appl. No. 10/464,969, filed Jun. 18, 2003, Office Action mailed on Nov. 22, 2006.

Chaskar, H. et al., "Robust Transport of IP Traffic Over WDM Using Optical Burst Switching," Optical Networks Magazine, Jul./Aug. 2002, pp. 47-60.

Oh, Se-Yoon et al., "A Data Burst Assembly Algorithm in Optical Burst Switching Networks," ETRI Journal, vol. 24, No. 4, Aug. 2002, pp. 311-322, Electronics and Telecommunications Research Institute, Tejon, Korea.

IETF Networking Group RFC Standards Track, "Generalized Multi-Protocol Label Switching (GMPLS) Signaling Functional Description," Jan. 2003. Retrieved on Jul. 8, 2004 from http://www.ietf.org/rfc/rfc3471.txt.

Liu, Hang et al., "GMPLS-Based Control Plane for Optical Networks: Early Implementation Experience," Proceedings of the SPIE, vol. 4872, Jul. 29, 2002, pp. 220-229, SPIE, Bellingham, VA, US.

Sahara, et al., "Demonstration of Optical Burst Data Switching Using Photonic MPLS Routers Operated by GMPLS Signaling," OFC 2003, vol. 1, pp. 220-222.

Qiao, C. et al., "Polymorphic Control for Cost-Effective Design of Optical Networks", European transactions on Telecommunications, vol. 11, No. 1, Jan.-Feb. 2000, pp. 17-26.

Baldine, I. et al., "Jumpstart: A Just-in-Time Signaling Architecture for WDM Burst-Switched Networks", IEEE Communications Magazine, Feb. 2002, pp. 82-89.

Comellas, J. et al., "Integrated IP/WDM Routing in GMPLS-Based Optical Networks", IEEE Network, Mar./Apr. 2003, pp. 22-27.

Cidon, I. et al., "Connection Establishment in High-Speed Networks", IEEE/ACM Transactions on Networking, No. 4, Aug. 1993, pp. 469-481.

"Generalized Multiprotocol Label Switching (GMPLS)", Copyright© The International Engineering Consortium, Web ProForum Tutorials http://www.iec.org, pp. 1-27, 2005.

Floyd, Sally et al., "Modifying TCP's Congestion Control for High Speeds", May 5, 2002, pp. 1-5.

FredJ, S. Ben et al., "Statistical Bandwidth Sharing: A Study of Congestion at Flow Level", France Telecom R&D, pp. 111-122, 2001.

Zeljkovic, Nada et al., "A Simulation Analysis of Statistical Multiplexing in Frame Relay and ATM Internetworking", TELESIKS 2001, Sep. 19-21, 2001, Nis, Yugoslavia, pp. 116-119.

Kumaran, Krishnan et al., "Multiplexing Regulated Traffic Streams: Design and Performance", Bell Laboratories/Lucent Technologies, IEEE INFOCOM 2001, pp. 527-536.

Su, C.-F. et al., "On Statistical Multiplexing, Traffic Mixes, and VP Management", University of Texas at Austin, 1998 IEEE.

Brown, Timothy X., "Adaptive Statistical Multiplexing for Broadband Communication", Performance Evaluation and Application of ATM Networks, Kouvalsos, D. editor, Kluwer, 2000, pp. 51-80.

Walch, Philip F., "FEC Standards and Long Haul STM-64 DWDM Transmission," Contribution to T1 Standards Project T1X1.5, Jan. 17-20, 2000, pp. 1-4.

"ITU-T Rec. G.709/Y.1331—Interfaces for the Optical Transport Network (OTN)", International Telecommunication Union, Mar. 2003, pp. 1-109.

Henderson, Michael, "Forward Error Correction in Optical Network," Mar. 27, 2001. http://members.cox.net/michaeleo.henderson/Papers/Optical_FEC.pdf, pp. 1-18.

Wei, Wei et al., "GMPLS-Based Hierarchical Optical Routing Switching Architecture", Proceedings of SPIE, vol. 4585, 2001, pp. 328-334.

Banerjee, A. et al., "Generalized Multiprotocol Label Switching: An Overview of Routing and Management Enhancements," IEEE Communications Magazine, Jan. 2001, pp. 144-150.

Kim, Y. et al., "Discrete Event Simulation of the DiffServ-over-MPLS with NIST GMPLS Lightwave Agile Switching Simulator (GLASS)," Joint Conference of Communication and Information -2002, Jeju, Korea, 4 pgs.

Ovadia et al., "Architecture and Method for Framing Control and Data Burts Over 10 GBIT Ethernet With and Without Wan Interface Sublayer Support", U.S. Appl. No. 10/459,781, filed Jun. 11, 2003, Office Action mailed on Oct. 18, 2006.

Maciocco et al., "Method and System to Frame and Format Optical Control and Data Bursts in WDM-Based Photonic Burst Switched Networks", U. S. Appl. No. 10/377,580, filed Feb. 28, 2003, Final Office Action mailed on Oct. 26, 2006.

Mike J. O'Mahony, et al., "The Application of Optical Packet Switching in Future Communication Networks", *IEEE Communication Magazine*, Mar. 2001.

Shun Yao, et al., "All-Optical Packet Switching for Metropolitan Area Networks: Opportunities and Chllenges", *IEEE Communications Magazine*, Mar. 2001.

Dr. Chunming Qiao, et al., "Optical Burst Switching", *Business Briefing: Global Photonics Applications and Technology*, 1999.

Chunming Qiao, "Labeled Optical Burst Switching for IP-over-WDM Integration", *IEEE Communications Magazine*, Sep. 2000.

A. Carena, et al., "OPERA: An Optical Packet Experimental Routing Architecture with Label Swapping Capability", *Journal of Lightwave Technology*, vol. 16, No. 12, Dec. 1998.

Wen De Zhong, "A New Wavelength-Routed Photonic Packet Buffer Combing Traveling Delay Lines with Delay-Line Loops", *Journal of Lightwave Technology*, vol. 19, No. 8, Aug. 2001.

D. Wiesmann et al., "Apodized Surface-Corrugated Gratings with Varying Duty Cycles", *IEEE Photonics Technology Letter*, vol. 12, No. 6, Jun. 2000.

Kenneth O. Hill, et al., "Fiber Gragg Grating Technology Fundamentals and Overview", *Journal of Lightwave Technology*, vol. 15, No. 8, Aug. 1997.

Turan Erdogan, "Fiber Grating Spectra", *Journal of Lightwave Technology*, vol. 15, No. 8, Aug. 1997.

K. Sugden et al., "Fabrication and Characterization of Bandpass Filters Based on Concatenated Chirped Faber Gratings", *Journal of Lightwave Technology*, vol. 15, No. 8, Aug. 1997.

C. R. Giles, "Lightwave Application of Fiber Bragg Gratings", *Journal of Lightwave Technology*, vol. 15, No. 8, Aug. 1997.

A. E. Willner, et al., "Tunable Compensation of Channel Degrading Effects Using Nonlinearly Chirped Passive Fiber Bragg Gratings", *IEEE Journal of Selected Topics in Quantum Electronics*, vol. 5, No. 5, Sep./Oct. 1999.

P.V. Studenkov, et al., "Asymmetric Twin-Waveguide 1.55μm Wavelength Laser with a Distributed Bragg Reflector", *IEEE Photonic Technology Letters*, vol. 12, No. 5, May 2000.

Yasuo Shibata et al., "Coupling Coeffiecient Modulation of Waveguide Grating Using Sampled Grating", *IEEE Photonics Technology Letters*, vol. 6, No. 10, Oct. 1994.

Greg Bernstein et al., "OIF UNI 1.0—Controlling Optical Networks", info@inforum.com, 2001.

(Abstract), "MPLS Technologies for IP Networking Solution", pp. 1-5, 2001.

Rick Gallaher, "An Introduction to MPLS", *Course Director for Global Knowledge and President of Telecommunications Technical Services, Inc.*, Sep. 10, 2001.

"Compare SANs to Alternate Technologies", *Brocade*, http://www.brocade.com/san/evaluate/compare_san.jsp p. 1 of 4, Feb. 26, 2003.

Ravi Kumar Khattar, et, "Introduction to Storage Area Network, SAN", *International Technical Support Organization*, www.redbooks.ibm.com, 1999.

* cited by examiner

OPTICAL DATA BURST FORMAT

OPTICAL CONTROL BURST FORMAT

ARCHITECTURE, METHOD AND SYSTEM OF MULTIPLE HIGH-SPEED SERVERS TO NETWORK IN WDM BASED PHOTONIC BURST-SWITCHED NETWORKS

CROSS REFERENCE TO RELATED APPLICATIONS

The present application is related to U.S. patent application Ser. No. 10/126,091, filed Apr. 17, 2002, U.S. patent application Ser. No. 10/183,111, filed Jun. 25, 2002, U.S. patent application Ser. No. 10/328,571, filed Dec. 24, 2002, U.S. patent application Ser. No. 10/377,312 and U.S. patent application Ser. No. 10/377,580.

FIELD OF THE INVENTION

An embodiment of the present invention relates to optical networks in general; and, more specifically, to high-speed networking of multiple servers in photonic burst switched networks.

BACKGROUND INFORMATION

Transmission bandwidth demands in telecommunication networks (e.g., the Internet) appear to be ever increasing and solutions are being sought to support this bandwidth demand. One solution to this problem is to use fiber-optic networks, where wavelength-division-multiplexing (WDM) technology is used to support the ever-growing demand in optical networks for higher data rates.

Conventional optical switched networks typically use wavelength routing techniques, which require that optical-electrical-optical (O-E-O) conversion of optical signals be done at the optical switches. O-E-O conversion at each switching node in the optical network is not only very slow operation (typically about ten milliseconds), but it is very costly, and potentially creates a traffic bottleneck for the optical switched network. In addition, the current optical switch technologies cannot efficiently support "bursty" traffic that is often experienced in packet communication applications (e.g., the Internet).

A large communication network can be implemented using several sub-networks. For example, a large network to support Internet traffic can be divided into a large number of relatively small access networks operated by Internet service providers (ISPs), which are coupled to a number of metropolitan area networks (Optical MANs), which are in turn coupled to a large "backbone" wide area network (WAN). The optical MANs and WANs typically require a higher bandwidth than local-area networks (LANs) in order to provide an adequate level of service demanded by their high-end users. However, as LAN speeds/bandwidth increase with improved technology, there is a need for increasing MAN/WAN speeds/bandwidth.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

Figure 1:
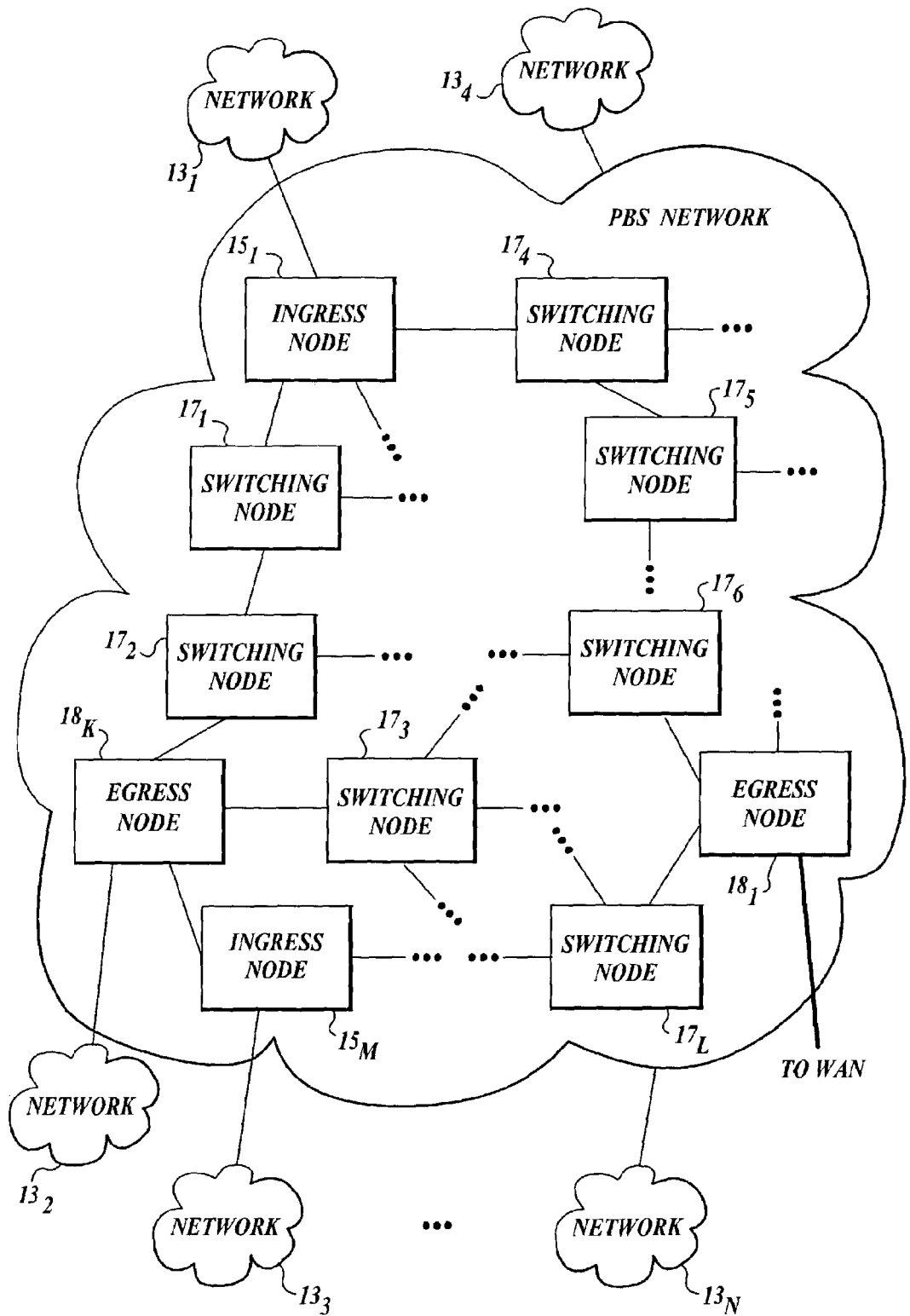
FIG. 1 is a simplified block diagram illustrating a photonic burst switched (PBS) network with variable time slot provisioning, according to one embodiment of the present invention.

FIG. 1 illustrates a photonic burst-switched (PBS) network 10, according to one embodiment of the present invention. The term photonic burst is used herein to refer to statistically-multiplexed packets (e.g., Internet protocol (IP) packets or Ethernet frames) having similar routing requirements). A photonic burst typically includes a photonic label including the header and other routing information of the IP packets and a payload including the data segments of the packets.

This embodiment of PBS network 10 includes local area networks (LANs) $13_1$-$13_N$ and a backbone optical WAN (not shown). In addition, this embodiment of PBS network 10 includes ingress nodes $15_1$-$15_M$, switching nodes $17_1$-$17_L$, and egress nodes $18_1$-$18_K$. PBS network 10 can include other ingress, egress and switching nodes (not shown) that are interconnected with the switching nodes shown in FIG. 1. The ingress and egress nodes are also referred to herein as edge nodes in that they logically reside at the edge of the PBS network. The edge nodes, in effect, provide an interface between the aforementioned "external" networks (i.e., external to the PBS network) and the switching nodes of the PBS network. In this embodiment, the ingress, egress and switching nodes are implemented with intelligent modules. This embodiment can be used, for example, as a metropolitan area network connecting a large number of LANs within the metropolitan area to a large optical backbone network.

In some embodiments, the ingress nodes perform optical-electrical (O-E) conversion of received optical signals, and include electronic memory to buffer the received signals until they are sent to the appropriate LAN. In addition, in some embodiments, the ingress nodes also perform electrical-optical (E-O) conversion of the received electrical signals before they are transmitted to switching nodes $17_1$-$17_M$ of PBS network 10.

Egress nodes are implemented with optical switching units or modules that are configured to receive optical signals from other nodes of PBS network 10 and route them to the optical WAN or other external networks. Egress nodes can also receive optical signals from the optical WAN or other external network and send them to the appropriate node of PBS network 10. In one embodiment, egress node $18_1$ performs O-E-O conversion of received optical signals, and includes electronic memory to buffer received signals until they are sent to the appropriate node of PBS network 10 (or to the optical WAN).

Switching nodes $17_1$-$17_L$ are implemented with optical switching units or modules that are each configured to receive optical signals from other switching nodes and appropriately route the received optical signals to other switching nodes of PBS network 10. As is described below, the switching nodes perform O-E-O conversion of optical control bursts and network management control burst signals. In some embodiments, these optical control bursts and network management control bursts are propagated only on preselected wavelengths. The preselected wavelengths do not propagate optical "data" bursts (as opposed to control bursts and network management control bursts) signals in such embodiments, even though the control bursts and network management control bursts may include necessary information for a particular group of optical data burst signals. The control and data information is transmitted on separate wavelengths in some embodiments (also referred to herein as out-of-band signaling). In other embodiments, control and data information may be sent on the same wavelengths (also referred to herein as in-band signaling). In another embodiment, optical control bursts, network management control bursts, and optical data burst signals may be propagated on the same wavelength(s) using different encoding schemes such as different modulation formats, etc. In either approach, the optical control bursts and network management control bursts are sent asynchronously relative to its corresponding optical data burst signals. In still another embodiment, the optical control bursts and other control signals are propagated at different transmission rates as the optical data signals.

Although switching nodes $17_1$-$17_L$ may perform O-E-O conversion of the optical control signals, in this embodiment, the switching nodes do not perform O-E-O conversion of the optical data burst signals. Rather, switching nodes $17_1$-$17_L$ perform purely optical switching of the optical data burst signals. Thus, the switching nodes can include electronic circuitry to store and process the incoming optical control bursts and network management control bursts that were converted to an electronic form and use this information to configure photonic burst switch settings, and to properly route the optical data burst signals corresponding to the optical control bursts. The new control bursts, which replace the previous control bursts based on the new routing information, are converted to an optical control signal, and it is transmitted to the next switching or egress nodes. Embodiments of the switching nodes are described further below.

Elements of exemplary PBS network 10 are interconnected as follows. LANs $13_1$-$13_N$ are connected to corresponding ones of ingress nodes $15_1$-$15_M$. Within PBS network 10, ingress nodes $15_1$-$15_M$ and egress nodes $18_1$-$18_K$ are connected to some of switching nodes $17_1$-$17_L$ via optical fibers. Switching nodes $17_1$-$17_L$ are also interconnected to each other via optical fibers in mesh architecture to form a relatively large number of lightpaths or optical links between the ingress nodes, and between ingress nodes $15_1$-$15_L$ and egress nodes $18_1$-$18_K$. Ideally, there are more than one lightpath to connect the switching nodes $17_1$-$17_L$ to each of the endpoints of PBS network 10 (i.e., the ingress nodes and egress nodes are endpoints within PBS network 10). Multiple lightpaths between switching nodes, ingress nodes, and egress nodes enable protection switching when one or more node fails, or can enable features such as primary and secondary route to destination.

As described below in conjunction with FIG. 2, the ingress, egress and switching nodes of PBS network 10 are configured to send and/or receive optical control bursts, optical data burst, and other control signals that are wavelength multiplexed so as to propagate the optical control bursts and control labels on pre-selected wavelength(s) and optical data burst or payloads on different preselected wavelength(s). Still further, the edge nodes of PBS network 10 can send optical control burst signals while sending data out of PBS network 10 (either optical or electrical).

Figure 2:
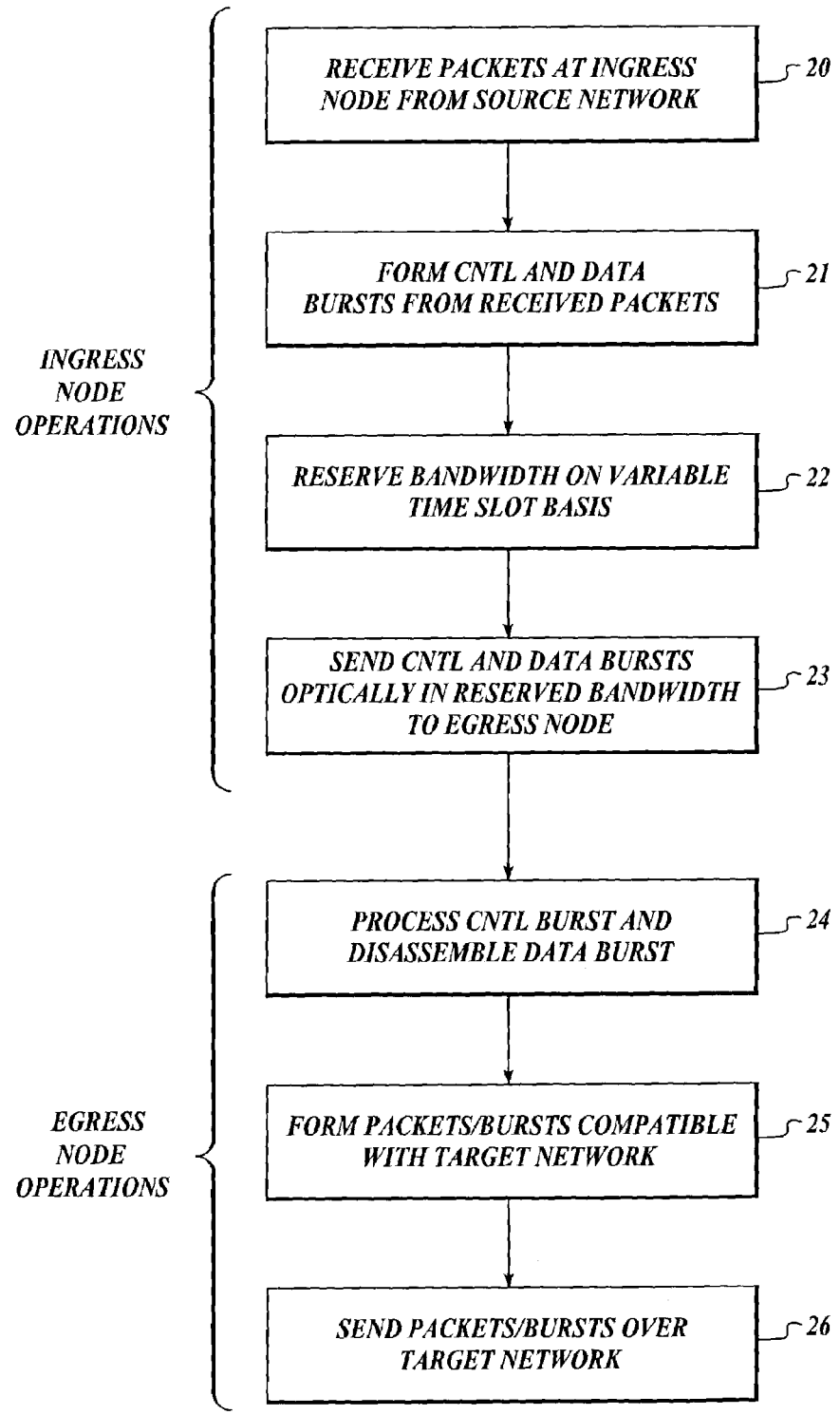
FIG. 2 is a simplified flow diagram illustrating the operation of a PBS network, according to one embodiment of the present invention.

FIG. 2 illustrates the operational flow of PBS network 10, according to one embodiment of the present invention. Referring to FIGS. 1 and 2, photonic burst switched network 10 operates as follows.

PBS network 10 receives packets from LANs $13_1$-$13_N$. In one embodiment, PBS network 10 receives IP packets at ingress nodes $15_1$-$15_M$. The received packets can be in electronic form rather than in optical form, or received in optical form and then converted to electronic form. In this embodiment, the ingress nodes store the received packets electronically. A block 20 represents this operation.

For clarity, the rest of the description of the operational flow of PBS network 10 focuses on the transport of information from ingress node $15_1$ to egress node $18_1$. The transport of information from ingress nodes $15_2$-$15_M$ to egress node $18_1$ (or other egress nodes) is substantially similar.

An optical burst label (i.e., an optical control burst) and optical payload (i.e., an optical data burst) is formed from the received packets. In one embodiment, ingress node $15_1$ uses statistical multiplexing techniques to form the optical data burst from the received IP (Internet Protocol) packets stored in ingress node $15_1$. For example, packets received by ingress node $15_1$ and having to pass through egress node $18_1$ on their paths to a destination can be assembled into an optical data burst payload. Statistical multiplexing generally refers to techniques for sharing a link or channel by multiple data sources based on statistics of the bandwidth used by the sources (e.g., an average) rather than the peak bandwidth required by each source. For example, statistical multiplexing techniques are disclosed by K. Kumaran and M. Mandjes, "Multiplexing Regulated Traffic Streams: Design and Performance" in Proc. of IEEE INFOCOM 2001; C.-F. Su and G. de Veciana, "On Statistical Multiplexing, Traffic Mixes, and VP Management" in Proc. of IEEE INFOCOM 1998; B. Maglaris, D. Anastassiou, P. Sen, G. Karlsson, and J. D. Robbins, "Performance Models of Statistical Multiplexing in Packet Video Communications," IEEE Transaction on Communications 36, 834-844, 1988, T. Brown, "Adaptive Statistical Multiplexing For Broadband Communication", Chapter 3, of "Performance Evaluation and Application of ATM Networks", Kouvatsos, D. editor, Kluwer, 2000. Other embodiments can use any suitable statistical multiplexing technique. A block 21 represents this operation.

Bandwidth on a specific optical channel and/or fiber is reserved to transport the optical data burst through PBS network 10. In one embodiment, ingress node $15_1$ reserves a time slot (i.e., a time slot of a TDM system) in an optical data signal path through PBS network 10. This time slot maybe fixed-time duration and/or variable-time duration with either uniform or non-uniform timing gaps between adjacent time slots. Further, in one embodiment, the bandwidth is reserved for a time period sufficient to transport the optical burst from the ingress node to the egress node. For example, in some embodiments, the ingress, egress, and switching nodes maintain an updated list of all used and available time slots. The time slots can be allocated and distributed over multiple wavelengths and optical fibers. Thus, a reserved time slot (also referred to herein as a TDM channel), that in different embodiments may be of fixed-duration or variable-duration, may be in one wavelength of one fiber, and/or can be spread across multiple wavelengths and multiple optical fibers. A block 22 represents this operation.

When an ingress and/or egress node reserves bandwidth or when bandwidth is released after an optical data burst is transported, a network controller (not shown) updates the list. In one embodiment, the network controller and the ingress or egress nodes perform this updating process using various burst or packet scheduling algorithms based on the available network resources and traffic patterns. The available variable-duration TDM channels, which are periodically broadcasted to all the ingress, switching, and egress nodes, are transmitted on the same wavelength as the optical control bursts or on a different common preselected wavelength throughout the optical network. The network controller function can reside in one of the ingress or egress nodes, or can be distributed across two or more ingress and/or egress nodes. In this embodiment, the network controller is part of control unit 37 (FIG. 3), which can include one or more processors.

The optical control bursts, network management control labels, and optical data bursts are then transported through photonic burst switched network 10 in the reserved time slot or TDM channel. In one embodiment, ingress node $15_1$ transmits the control burst to the next node along the optical label-switched path (OLSP) determined by the network controller. In this embodiment, the network controller uses a constraint-based routing protocol [e.g., generalized multi-protocol label switching (GMPLS) Draft Internet Engineering Task Force (IETF) Architecture-05 Internet-Draft, March 2003] over one or more wavelengths to determine the best available OLSP to the egress node.

In one embodiment, the control label (also referred to herein as a control burst) is transmitted asynchronously ahead of the photonic data burst and on a different wavelength and/or different fiber. The time offset between the control burst and the data burst allows each of the switching nodes to process the label and configure the photonic burst switches to appropriately switch before the arrival of the corresponding data burst. The term photonic burst switch is used herein to refer to fast optical switches that do not use O-E-O conversion.

In one embodiment, ingress node $15_1$ then asynchronously transmits the optical data bursts to the switching nodes where the optical data bursts experience little or no time delay and no O-E-O conversion within each of the switching nodes. The optical control burst is always sent before the corresponding optical data burst is transmitted.

In some embodiments, the switching node may perform O-E-O conversion of the control bursts so that the node can extract and process the routing information included in the label. Further, in some embodiments, the TDM channel is propagated in the same wavelengths that are used for propagating labels. Alternatively, the labels and payloads can be modulated on the same wavelength in the same optical fiber using different modulation formats. For example, optical labels can be transmitted using non-return-to-zero (NRZ) modulation format, while optical payloads are transmitted using return-to-zero (RZ) modulation format. The optical burst is transmitted from one switching node to another switching node in a similar manner until the optical control and data bursts are terminated at egress node $18_1$. A block 23 represents this operation.

The operational flow at this point depends on whether the target network is an optical WAN or a LAN. A block 24 represents this branch in the operational flow.

If the target network is an optical WAN, new optical label and payload signals are formed. In this embodiment, egress node $18_1$ prepares the new optical label and payload signals. A block 25 represents this operation.

The new optical label and payload are then transmitted to the target network (i.e., WAN in this case). In this embodiment, egress node $18_1$ includes an optical interface to transmit the optical label and payload to the optical WAN. A block 26 represents this operation.

However, if in block 24 the target network is a LAN, the optical data burst is disassembled to extract the IP packets or Ethernet frames. In this embodiment, egress node $18_1$ converts the optical data burst to electronic signals that egress node $18_1$ can process to recover the data segment of each of the packets, as represented in block 25 represents this operation.

The extracted IP data packets or Ethernet frames are processed, combined with the corresponding IP labels, and then routed to the target network (i.e., LAN in this case). In this embodiment, egress node $18_1$ forms these new IP packets. A block 28 represents this operation. The new IP packets are then transmitted to the target network (i.e., LAN) as represented in block 26.

PBS network 10 can achieve increased bandwidth efficiency through the additional flexibility afforded by the TDM channels. Although this exemplary embodiment described above includes an optical MAN having ingress, switching and egress nodes to couple multiple LANs to an optical WAN backbone, in other embodiments the networks do not have to be LANs, optical MANs or WAN backbones. That is, PBS network 10 may include a number of relatively small networks that are coupled to a relatively larger network that in turn is coupled to a backbone network.

Although a WDM embodiment is described above, in other embodiments, a single wavelength can be used for the entire PBS network. Some of these single wavelength alternative embodiments have multiple optical fibers interconnections between each node to provide increased bandwidth.

Figure 3:
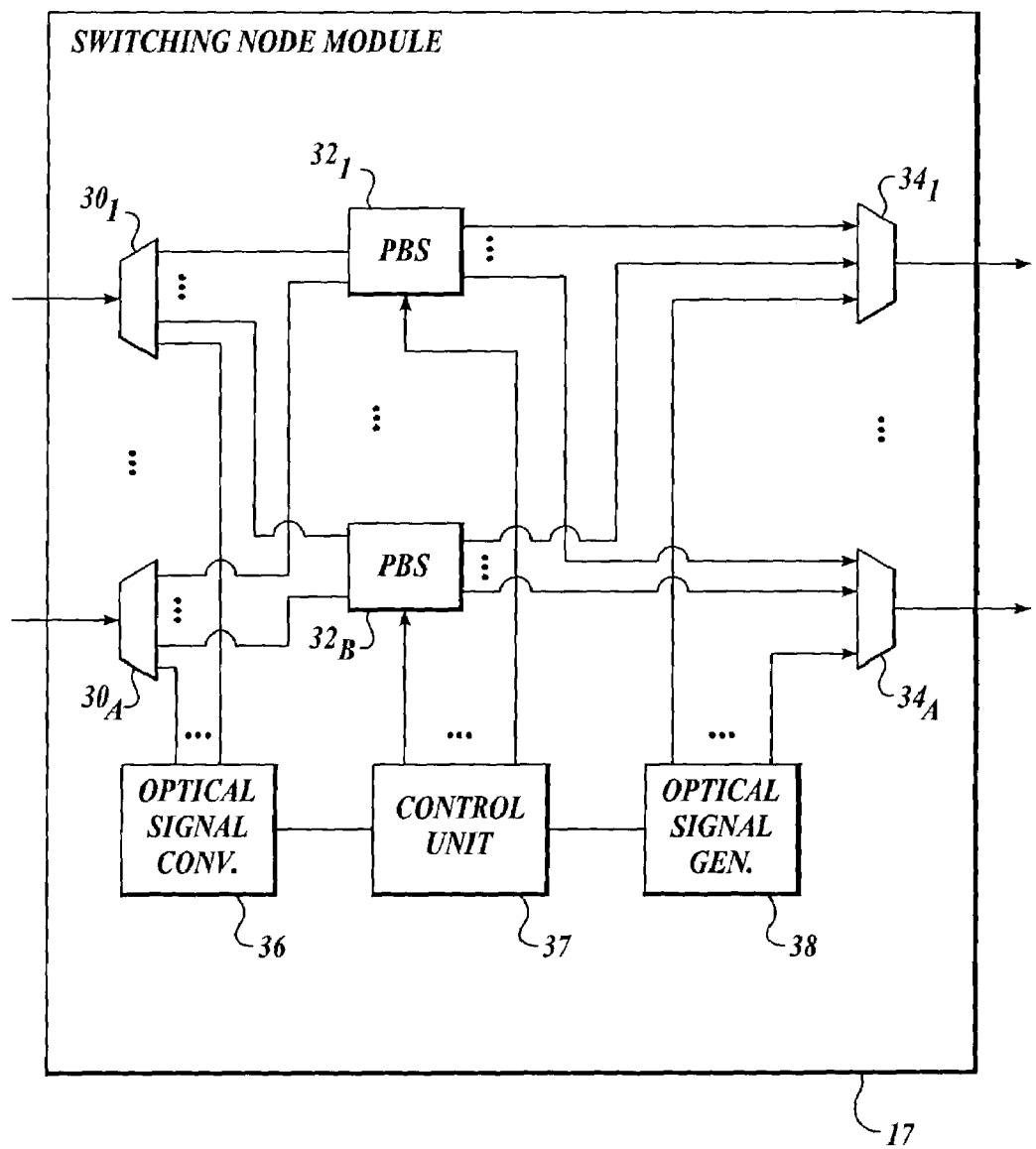
FIG. 3 is a block diagram illustrating a switching node module for use in a PBS network, according to one embodiment of the present invention.

FIG. 3 illustrates a module 17 for use as a switching node in photonic burst switched network 10 (FIG. 1), according to one embodiment of the present invention. In this embodiment, module 17 includes a set of optical wavelength division demultiplexers $30_1$-$30_A$, where A represents the number of input optical fibers used for propagating payloads, labels, and other network resources to the module. For example, in this embodiment, each input fiber could carry a set of C wavelengths (i.e., WDM wavelengths), although in other embodiments the input optical fibers may carry differing numbers of wavelengths. Module 17 would also include a set of N×N photonic burst switches $32_1$-$32_B$, where N is the number of input/output ports of each photonic burst switch. Thus, in this embodiment, the maximum number of wavelengths at each photonic burst switch is A·C, where N≧A·C+1. For embodiments in which N is greater than A·C, the extra input/output ports can be used to loop back an optical signal for buffering.

Further, although photonic burst switches $32_1$-$32_B$ are shown as separate units, they can be implemented as N×N photonic burst switches using any suitable switch architecture. Module 17 also includes a set of optical wavelength division multiplexers $34_1$-$34_A$, a set of optical-to-electrical signal converters 36 (e.g., photo-detectors), a control unit 37, and a set of electrical-to-optical signal converters 38 (e.g., lasers). Control unit 37 may have one or more processors to execute software or firmware programs.

Figure 10:
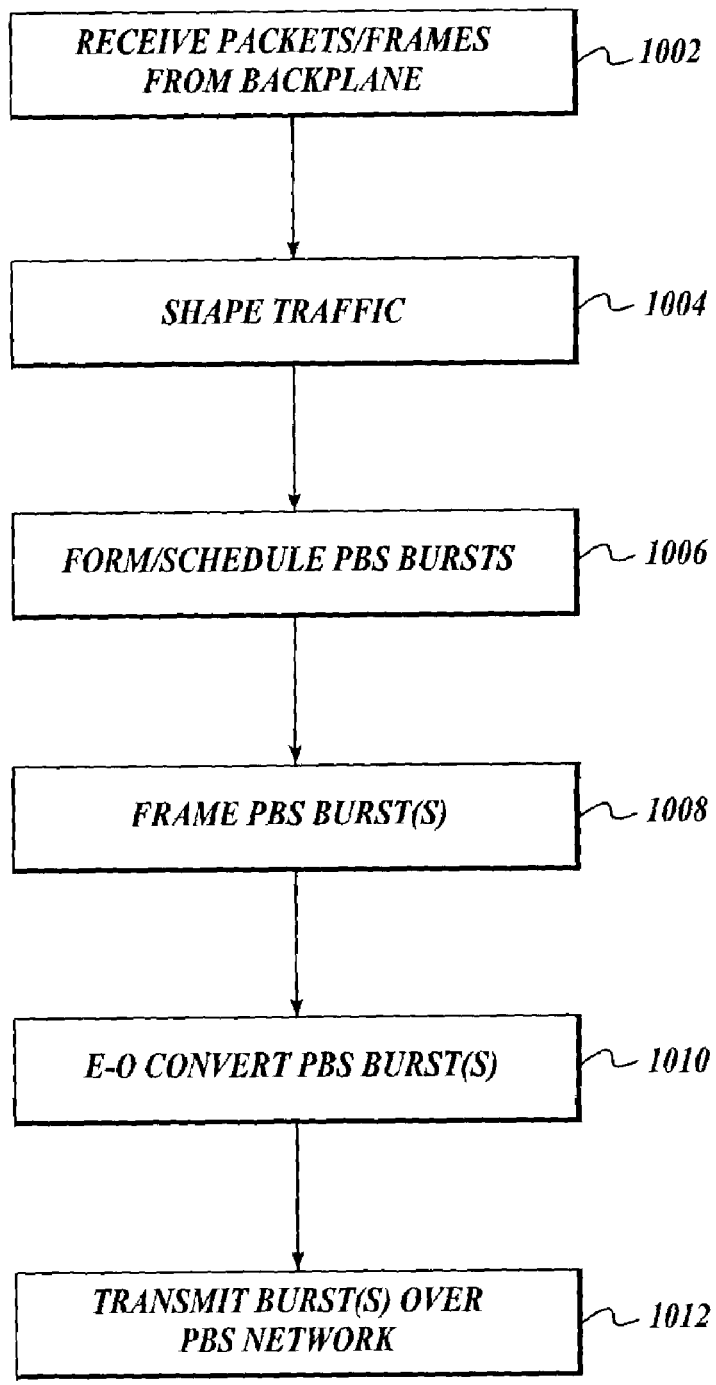
FIG. 10 is a flow diagram illustrating an ingress operational flow, according to one embodiment of the present invention.

The elements of this embodiment of module 17 are interconnected as follows. Optical demultiplexers $30_1$-$30_A$ are connected to a set of A input optical fibers that propagate input optical signals from other switching nodes of photonic burst switched network 10 (FIG. 10). The output leads of the optical demultiplexers are connected to the set of B core optical switches $32_1$-$32_B$ and to optical signal converter 36. For example, optical demultiplexer $30_1$ has B output leads connected to input leads of the photonic burst switches $32_1$-$32_B$ (i.e., one output lead of optical demultiplexer $30_1$ to one input lead of each photonic burst switch) and at least one output lead connected to optical signal converter 36.

The output leads of photonic burst switches $32_1$-$32_B$ are connected to optical multiplexers $34_1$-$34_A$. For example, photonic burst switch $32_1$ has A output leads connected to input leads of optical multiplexers $34_1$-$34_A$ (i.e., one output lead of photonic burst switch $32_1$ to one input lead of each optical multiplexer). Each optical multiplexer also an input lead connected to an output lead of electrical-to-optical signal converter 38. Control unit 37 has an input lead or port connected to the output lead or port of optical-to-electrical signal converter 36. The output leads of control unit 37 are connected to the control leads of photonic burst switches $32_1$-$32_B$ and electrical-to-optical signal converter 38. As described below in conjunction with the flow diagram of FIG. 5, module 17 is used to receive and transmit optical control bursts, optical data bursts, and network management control bursts. In one embodiment, the optical data bursts and optical control bursts have transmission formats as shown in FIGS. 4A and 4B.

Figure 4A:
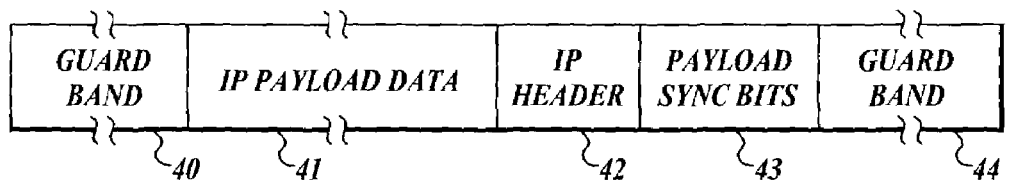
FIGS. 4A-4B are diagrams illustrating the formats of an optical data and control bursts for use in a PBS network, according to one embodiment of the present invention.

FIG. 4A illustrates the format of an optical data burst for use in PBS network 10 (FIG. 1), according to one embodiment of the present invention. In this embodiment, each optical data burst has a start guard band 40, an IP payload data segment 41, an IP header segment 42, a payload sync segment 43 (typically a small number of bits), and an end guard band 44 as shown in FIG. 4A. In some embodiments, IP payload data segment 41 includes the statistically-multiplexed IP data packets or Ethernet frames used to form the burst. Although FIG. 4A shows the payload as contiguous, module 17 transmits payloads in a TDM format. Further, in some embodiments the data burst can be segmented over multiple TDM channels. It should be pointed out that in this embodiment the optical data bursts and optical control bursts have local significance only in PBS network 10, and may loose their significance at the optical WAN.

Figure 4B:
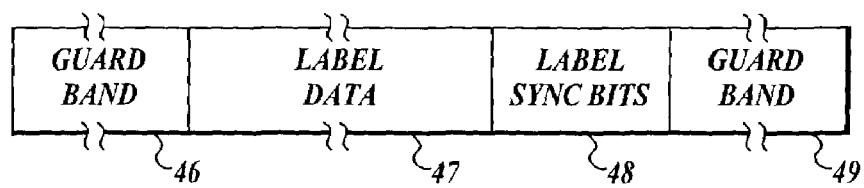

FIG. 4B illustrates the format of an optical control burst for use in photonic burst switched network 10 (FIG. 1), according to one embodiment of the present invention. In this embodiment, each optical control burst has a start guard band 46, an IP label data segment 47, a label sync segment 48 (typically a small number of bits), and an end guard band 49 as shown in FIG. 4B. In this embodiment, label data segment 45 includes all the necessary routing and timing information of the IP packets to form the optical burst. Although FIG. 4B shows the payload as contiguous, in this embodiment module 17 transmits labels in a TDM format.

In some embodiments, an optical network management control label (not shown) is also used in PBS network 10 (FIG. 1). In such embodiments, each optical network management control burst includes: a start guard band similar to start guard band 46; a network management data segment similar to data segment 47; a network management sync segment (typically a small number of bits) similar to label sync segment 48; and an end guard band similar to end guard band 44. In this embodiment, network management data segment includes network management information needed to coordinate transmissions over the network. In some embodiments, the optical network management control burst is transmitted in a TDM format.

Figure 5:
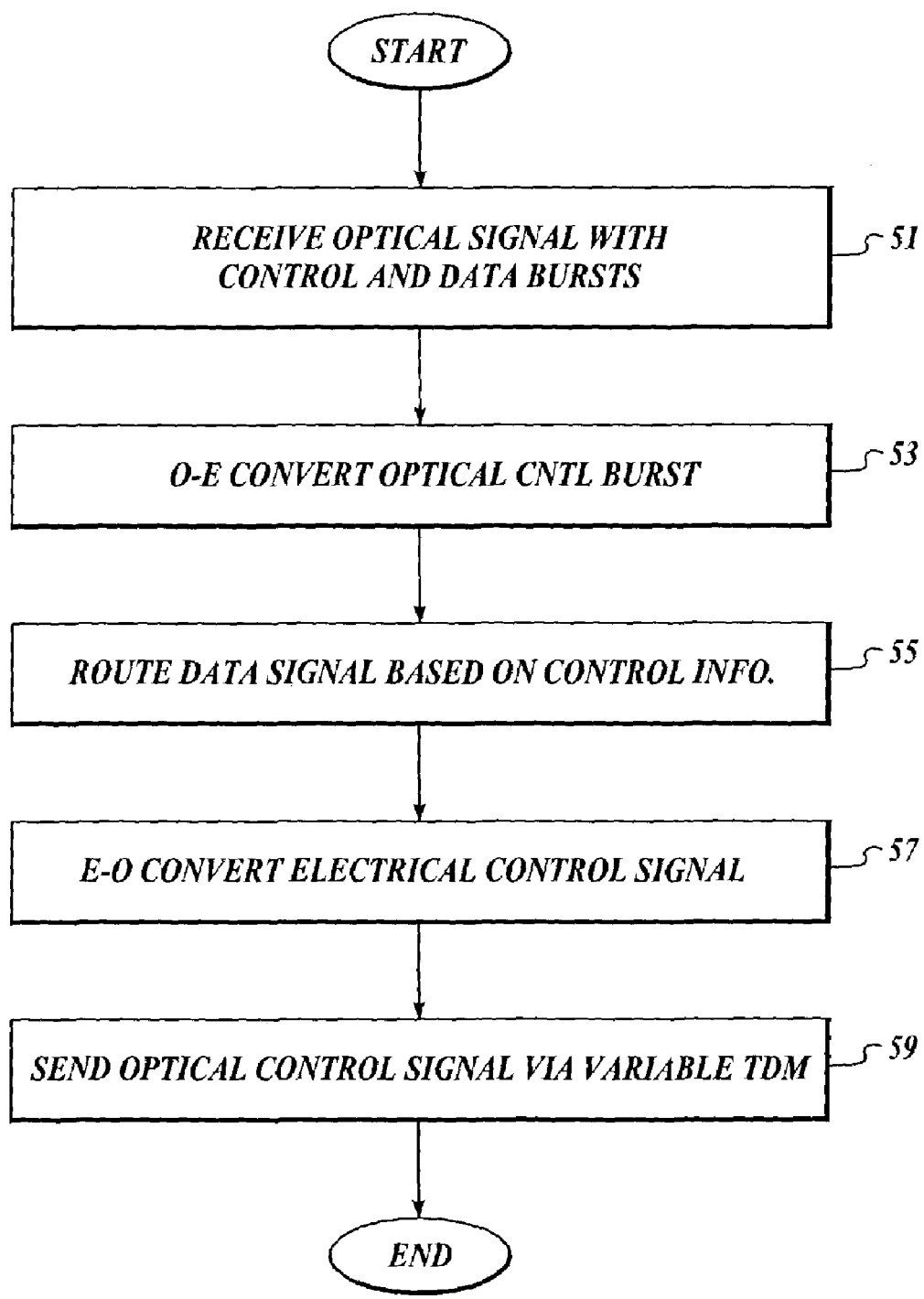
FIG. 5 is a flow diagram illustrating the operation of a switching node module, according to one embodiment of the present invention.

FIG. 5 illustrates the operational flow of module 17 (FIG. 3), according to one embodiment of the present invention. Referring to FIGS. 3 and 5, module 17 operates as follows.

Module 17 receives an optical signal with TDM label and data signals. In this embodiment, module 17 receives an optical control signal (e.g., an optical control burst) and an optical data signal (i.e., an optical data burst in this embodiment) at one or two of the optical demultiplexers. For example, the optical control signal may be modulated on a first wavelength of an optical signal received by optical demultiplexer $30_A$, while the optical data signal is modulated on a second wavelength of the optical signal received by optical demultiplexer $30_A$. In some embodiments, the optical control signal may be received by a first optical demultiplexer while the optical data signal is received by a second optical demultiplexer. Further, in some cases, only an optical control signal (e.g., a network management control burst) is received. A block 51 represents this operation.

Module 17 converts the optical control signal into an electrical signal. In this embodiment, the optical control signal is the optical control burst signal, which is separated from the received optical data signal by the optical demultiplexer and sent to optical-to-electrical signal converter 36. In other embodiments, the optical control signal can be a network management control burst (previously described in conjunction with FIG. 4B). Optical-to-electrical signal converter 36 converts the optical control signal into an electrical signal. For example, in one embodiment each portion of the TDM control signal is converted to an electrical signal. The electrical control signals received by control unit 37 are processed to form a new control signal. In this embodiment, control unit 37 stores and processes the information included in the control signals. A block 53 represents this operation.

Module 17 then routes the optical data signals (i.e., optical data burst in this embodiment) to one of optical multiplexers $34_1$-$34_A$, based on routing information included in the control signal. In this embodiment, control unit 37 processes the control burst to extract the routing and timing information and sends appropriate PBS configuration signals to the set of B photonic burst switches $32_1$-$32_B$ to re-configure each of the photonic burst switches to switch the corresponding optical data bursts. A block 55 represents this operation.

Module 17 then converts the processed electrical control signal to a new optical control burst. In this embodiment, control unit 37 provides TDM channel alignment so that reconverted or new optical control bursts are generated in the desired wavelength and TDM time slot pattern. The new control burst may be modulated on a wavelength and/or time slot different from the wavelength and/or time slot of the control burst received in block 51. A block 57 represents this operation.

Module 17 then sends the optical control burst to the next switching node in the route. In this embodiment, electrical-to-optical signal generator 38 sends the new optical control burst to appropriate optical multiplexer of optical multiplexers $34_1$-$34_A$ to achieve the route. A block 59 represents this operation.

Figure 6:
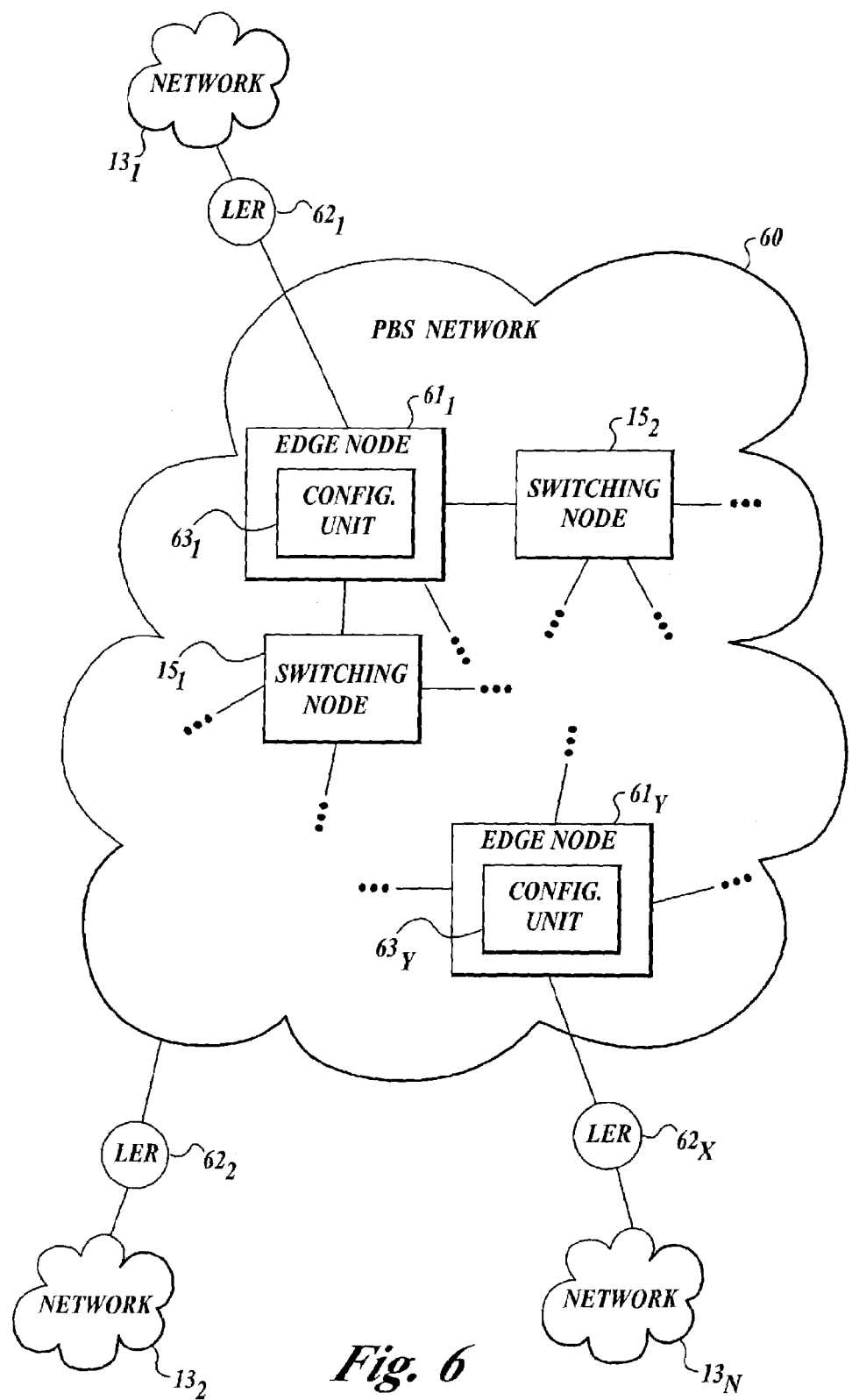
FIG. 6 is a diagram illustrating a PBS network with server edge nodes, according to one embodiment of the present invention.

FIG. 6 illustrates a PBS network 60 with server edge nodes, according to one embodiment of the present invention. In this example, PBS network 60 is similar to PBS network 10 (FIG. 1) except that one or more ingress and egress nodes are replaced with edge nodes $61_1$-$61_Y$. Edge nodes $61_1$-$61_Y$ include configuration units $63_1$-$63_Y$, respectively. The term "configuration unit", as used herein, refers to a unit that provides services to clients via PBS network 60 such as, for example, servers (e.g., file or application), or storage. Storage services can include, for example, direct attached storage (DAS), network attached storage (NAS), or storage device(s) if PBS network 60 is implementing a PBS-based storage area network (SAN). Examples of configuration units are described below in conjunction with FIGS. 6A-6C.

In this embodiment, networks $13_1$-$13_N$ are connected to edge nodes $61_1$-$61_Y$ via label edge routers (LERS) $62_1$-$62_X$. In some embodiments networks $13_1$-$13_N$ are LAN, WAN, SANs, and/or other PBS networks. In some embodiments, the network can be connected directly to an edge node without a LER. The nodes (i.e., ingress, egress, edge, and switching nodes) of PBS network 60 are interconnected as previously described in conjunction with PBS network 10 (FIG. 1).

For clarity, the operation of PBS network 60 is described below using an example in which configuration units $62_1$-$62_X$ are multi-server units. In typical applications, the multi-server units can support high bandwidth and/or delay sensitive applications such as, for example, file server, mail server, media server, application server, web server, etc. applications. The operation is similar when configuration units are used for storage applications.

The operation of PBS network 60 is significantly different from conventional networks having conventional servers such as server farms or blade servers. In conventional networks, the servers are simply other devices connected to the network, competing for network resources such as bandwidth. In some applications, servers communicate with each other over a network. However, the servers provide little or no network provisioning and traffic engineering functionality. Thus, most traffic on the network is transmitted on a best effort basis, representing a bottleneck in the transfer of information between server farms.

In contrast, this embodiment of PBS network 60 avoids this bottleneck by modifying conventional server farms (or other multi-server or storage units) to serve as edge nodes $61_1$-$61_Y$ in a PBS network. These modified multi-server units (i.e., configuration units $63_1$-$63_Y$) have an optical PBS interface (e.g., see FIG. 6A) and aggregate information into optical PBS control and data bursts to be sent over the PBS network. As previously described, the PBS network provides high speed networking, especially in applications in which the information transfers are "bursty" as in some packet-type communication protocols (e.g., IP and Ethernet). One embodiment of a multi-server unit is described below in conjunction with FIG. 7.

Figure 6A:
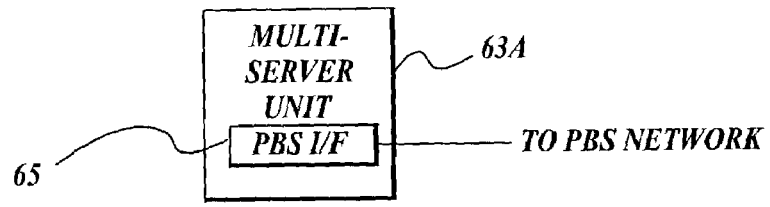
FIGS. 6A-6C are diagrams illustrating configuration units depicted in FIG. 6, according to embodiments of the present invention.

FIG. 6A illustrates an embodiment of a configuration unit 63A that can be used to implement one or more of configuration units $63_1$-$63_Y$ (FIG. 6). The multi-server unit includes a PBS interface 65, which can form/transmit PBS control and data bursts optically over the PBS network; and can receive/process optical PBS bursts from the PBS network. One embodiment is described in more detail below in conjunction with FIG. 7.

In some embodiments, the servers of configuration unit 63A (and/or other multi-server configuration units in the PBS network) can be organized into one ore more server clusters. Each server cluster is seen as a single server by other clients connected to the PBS network. Such embodiments can provide load balancing (which can improve performance) and fault recovery capability to recover from, for example, server or other hardware failures, server software failures, or connection failures. In addition, clustering can be used in these embodiments to selectively connect or disconnect a server (or servers) from the cluster, which effectively disconnects it from the PBS network.

To form a cluster, each server in the cluster includes clustering software to detect faults, perform failover operations, and perform load balancing operations. The clustering software can also include components to support selective connect/disconnect of servers from the cluster, which will effectively add/remove them from the PBS Network. Suitable clustering software is commercially available for several operating systems used in servers. For hardware, the servers in the cluster are interconnected via a network (typically separate from the network used by clients) used for communication/polling between the servers of the cluster. The hardware can also include redundant storage devices that are shared by the servers in the cluster either through direct connection or via one or more hubs.

Figure 6B:
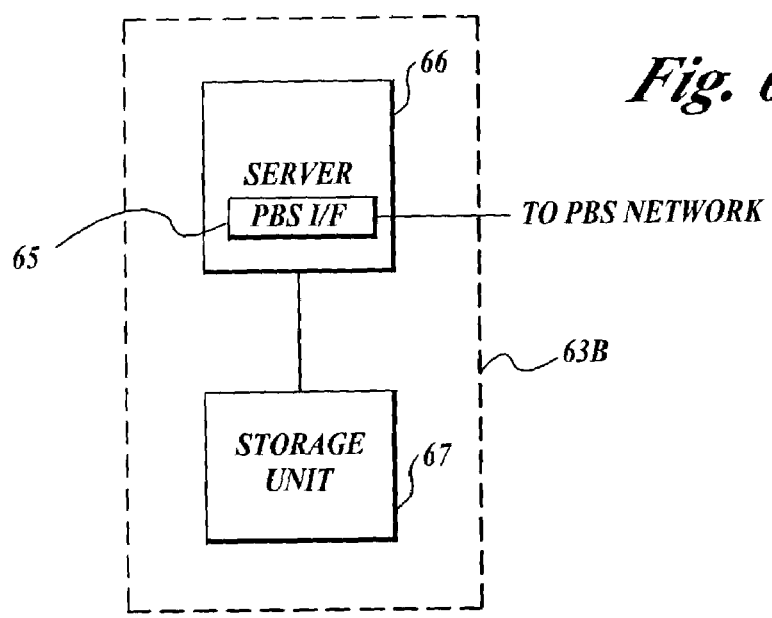

FIG. 6B illustrates a configuration unit 63B that can be used to implement one or more of configuration units $63_1$-$63_Y$ (FIG. 6), according to one embodiment of the present invention. In this embodiment, configuration unit 63B includes a server 66 with an attached storage unit 67 for use as a DAS unit. Server 66 includes PBS interface 65 for transferring data over the PBS network. Storage unit 67 can be implemented with one or more hard drives, tape drives, etc., and typically communicates with server 66 via various types of interfaces such as a small computer system interface (SCSI) (e.g. SCSI Architecture Model-3, working draft of T10, Technical Committee of Accredited Standards Committee INCITS, Mar. 19, 2003), Internet SCSI (iSCSI) interface (e.g., iSCSI draft #20, IP storage working group, Internet Engineering task force (IETF) Jan. 19, 2003), fiber channel (FC) interface (e.g., FC Protocol for SCSI (FCP-3) revision 0, Dec. 12, 2002), etc. In operation, information stored by storage unit 67 is available to other units connected to the PBS network via server 66.

Figure 6C:
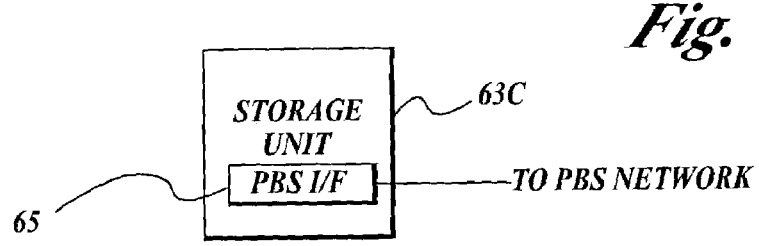

FIG. 6C illustrates an embodiment of a configuration unit 63C that can be used to implement one or more of configuration units $63_1$-$63_Y$ (FIG. 6). In this embodiment, configuration unit 63C is implemented with a storage unit with PBS interface 65 (i.e., no server is present). Configuration unit 63C can be used as a NAS unit in PBS network 60. For example, PBS network 60 can include one edge node having configuration unit 63C, with the rest of the edge nodes having configuration units like configuration unit 63A. This configuration allows all of the other edge nodes to access the storage unit directly via lightpaths in PBS network 60. However, in this NAS application, storage traffic is added to all of the other PBS traffic, which might decrease the performance of the PBS network.

In another configuration, configuration unit 63C can be used to implement all of configuration units $63_1$-$63_Y$ in PBS network 60 so that PBS network 60 functions like a SAN. In this configuration, PBS network 60 provides a network that is dedicated to storage traffic. Other networks (e.g., networks $13_1$-$13_N$ in FIG. 6) can then access the storage available in PBS network 60 via an edge node's egress capability.

Figure 7:
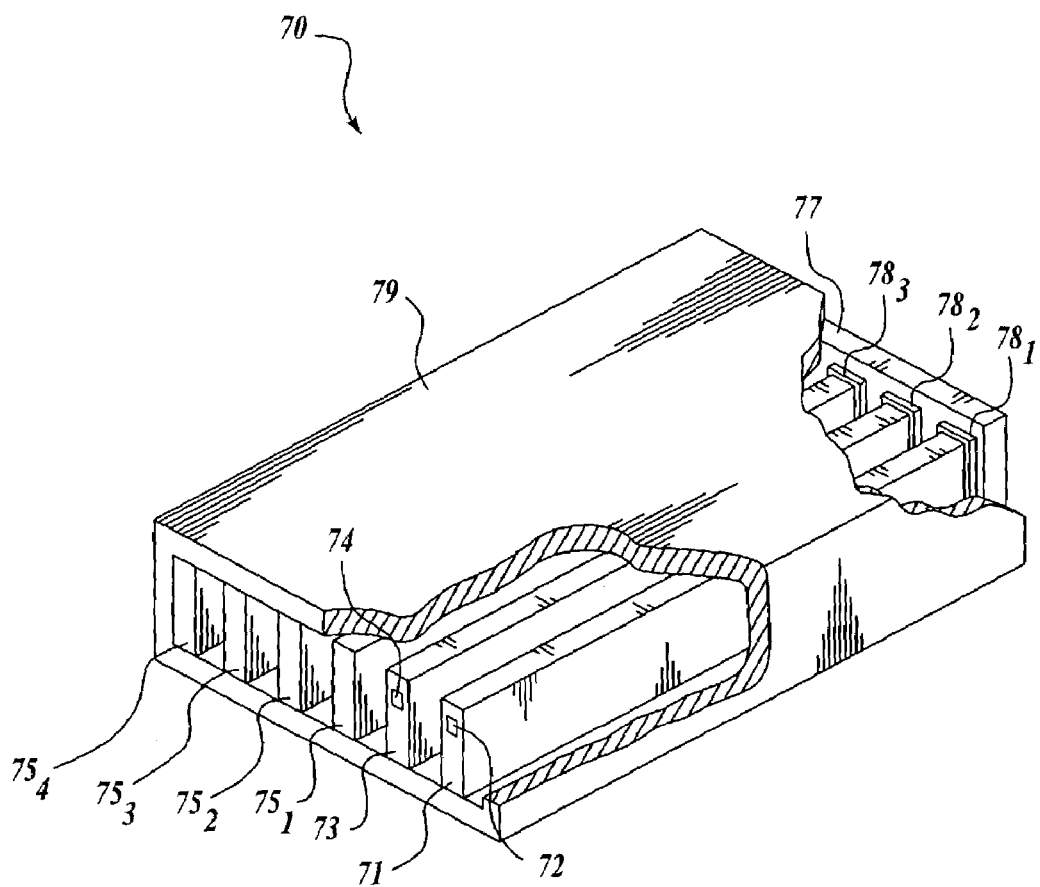
FIG. 7 is a diagram illustrating a multi-server/PBS edge node unit, according to one embodiment of the present invention.

FIG. 7 illustrates a modular reconfigurable multi-server/PBS edge node unit 70, according to one embodiment of the present invention. In this embodiment, unit 70 includes an optical I/O card or module 71 having a PBS optical port 72, a legacy interface card or module 73 having a legacy port 74, four configuration modules $75_1$-$75_4$ (i.e., server cards or modules in this embodiment), a backplane 77, connectors $78_1$-$78_6$ (only connectors $78_1$-$78_3$ are visible in FIG. 7) and a chassis 79. In some embodiments, unit 70 may include fewer or more than four server modules. In other embodiments, unit 70 maybe differently configured from the embodiment shown in FIG. 7.

One embodiment of optical I/O module 71 is described below in conjunction with FIGS. 8 and 8A.

In this embodiment, legacy interface card 73 is a gigabit Ethernet (GbE) card for communicating with a LER or other LAN/WAN networks using a GbE Ethernet protocol. In other embodiments, different legacy protocols can be used.

In this embodiment, server modules $75_1$-$75_4$ are self-contained high-speed server modules, where a single or multiple servers are implemented as a single integrated module.

In some embodiments, backplane 79 includes an electronic switching fabric with buffers and with electrical buses (see FIG. 8), power supply, control, etc., similar to those used in commercially available blade server systems. In one embodiment, the electrical buses support a star or double star network topology to switch to suitable electrical interfaces e.g., Peripheral Component Interconnect (PCI) (e.g., PCI Specification v2.2, Jan. 25, 1999) or PCI-Express (e.g., PCI-X Specification v.1.0, Sep. 27, 1999), InfiniBand® (e.g., InfiniBand®1.0 specification Oct. 24, 2000) interfaces] in the server modules. In other embodiments, the backplane can include other types of wired switching fabrics. Wired switching fabrics as used herein can also refer to optical switching fabrics or combination of optical and electrical switching fabric.

These elements of unit 70 are interconnected as follows. Optical I/O module 71, legacy interface module 73 and server modules $75_1$-$75_4$ are connected to backplane 77 (and the aforementioned electrical switching fabric 830) via connectors $78_1$-$78_6$. Optical port 72 is connected to a PBS network (e.g., PBS network 60 in FIG. 6). Legacy port 74 is connected to a legacy network or LER (e.g., see FIG. 6). Chassis 79 houses and physically supports the modules, connectors and backplane. Chassis 79 also includes other units (e.g., power supplies, cooling fan or fans, etc.) that are not shown in FIG. 7 to avoid obscuring the invention.

In operation, unit 70 can operate as a conventional multi-server unit providing services to clients coupled to the legacy network. For example, in one embodiment, data traffic between the client and a server module (i.e., one of server modules $75_1$-$75_4$) can be carried via legacy interface module 73, backplane 77 and the appropriate server of server modules $75_1$-$75_4$, as in a conventional multi-server unit.

In addition, a server module (i.e., one of server modules $75_1$-$75_4$) may provide services to a client via the PBS network and optical I/O module 71. However, unlike in a conventional multi-server unit, optical I/O module 71 receives optical PBS burst(s) from the client, which are then O-E converted, de-framed, and processed as previously described for an ingress node of PBS network 10 (FIG. 1). Optical I/O module 71 provides all the necessary information to route the incoming traffic to the appropriate server module (i.e., one of server modules $75_1$-$75_4$) via backplane 77 in the same manner as a server module would transfer information over backplane 77.

Similarly, a server module of unit 70 provides all the necessary information to a client via backplane 77, optical I/O module 71 and the PBS network. Unlike conventional multi-server units, optical I/O module 71 of unit 70 statistically multiplexes the incoming traffic flows (e.g., IP packets, Ethernet frames) from one or more server modules to form PBS control and data bursts in substantially the same manner as previously described for an ingress node of a PBS network 10 (FIG. 1). The PBS burst(s) are then framed, scheduled, E-O converted and transmitted to the client via the PBS network as previously described for PBS network 10.

Traffic coming into unit 70 from a legacy network for transfer to a destination via the PBS network is received by unit 70 at legacy port 74. As previously stated, the legacy network can use a conventional networking protocol such as, for example, TCP/IP or Ethernet protocols. In this embodiment, the legacy network is an electrical GbE network, although other wired or wireless networks can be used in other embodiments. Legacy interface module 73 transmits the information received at legacy port 74 to optical I/O module 71 via backplane 77 in the same manner as any server module transfers information over backplane 77. Optical I/O module 71 forms the information from legacy interface module 73 into PBS burst(s) in substantially the same manner as previously described for an ingress node of a PBS network 10 (FIG. 1). The PBS burst(s) are then scheduled, E-O converted and transmitted to the client via the PBS network as previously described for PBS network 10.

Conversely, traffic coming into unit 70 from the PBS network for transfer to a destination via the legacy network is received by unit 70 at PBS optical port 72 in the form of optical control and data PBS burst(s). Optical I/O module 71 O-E converts the optical control and data burst(s) received at PBS optical port 72, de-frames the PBS burst(s), and de-multiplexes PBS control and data bursts into individual flows consisting, for example, of either IP packets and/or Ethernet frames). Then, the individual flows are transferred to legacy interface module 73 via backplane 77. Legacy interface module 73 then transfers the individual traffic flows to the legacy network.

Figure 8:
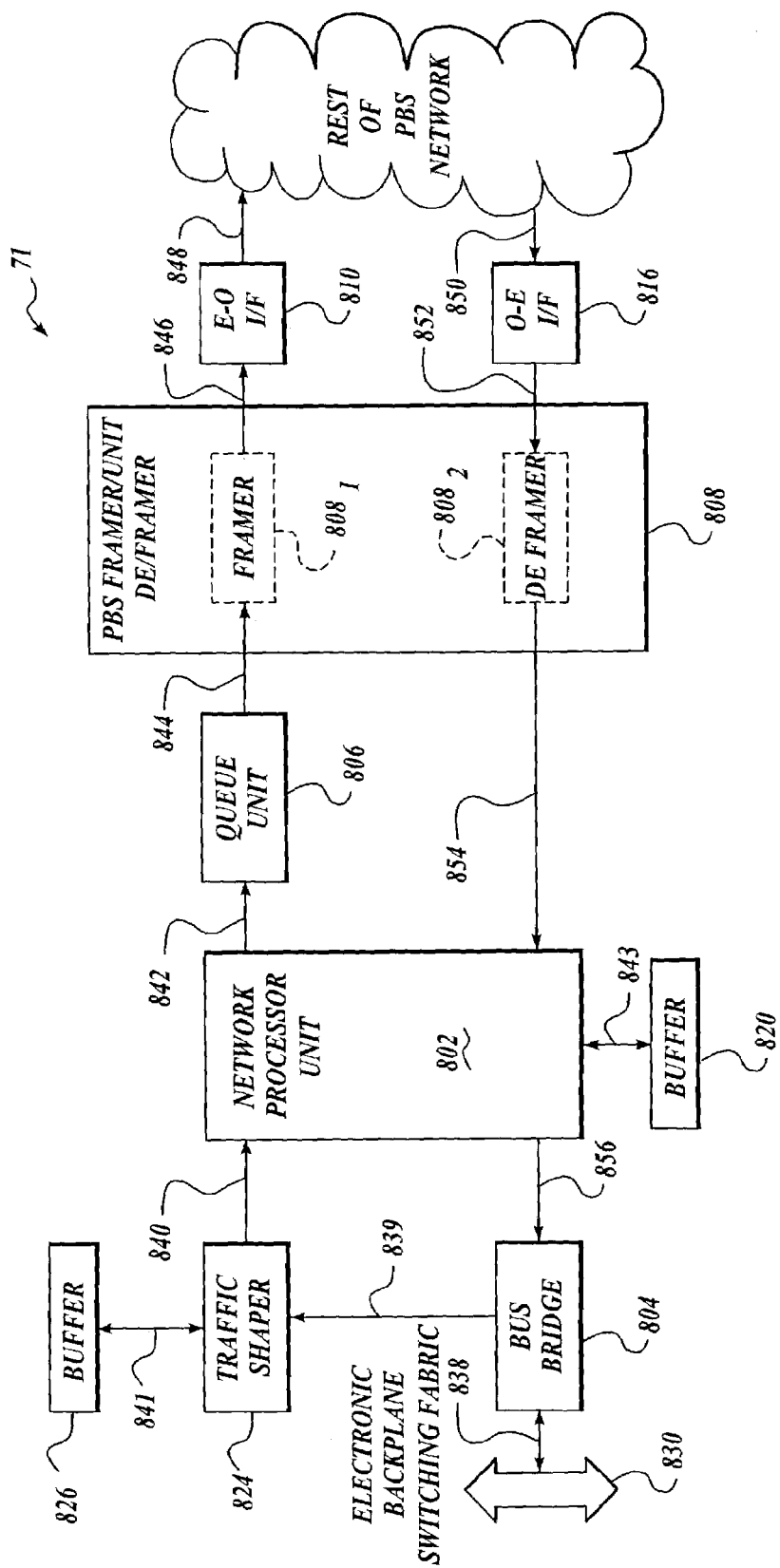
FIG. 8 is a block diagram illustrating an optical I/O card depicted in FIG. 7, according to one embodiment of the present invention.

FIG. 8 illustrates optical I/O module 71 (FIG. 7), according to one embodiment of the present invention. In this embodiment, optical I/O module 71 includes a network processor unit 802 (this unit could have multiple network processors), a bus bridge 804, a queue unit 806, a framer unit 808 (having framer and de-framer functions as indicated by blocks $808_1$ and $808_2$), an E-O interface 810, an O-E interface unit 816, a network processor buffer 820, a traffic shaper 824 and a traffic shaper buffer 826. In one embodiment, backplane switching fabric 830 includes a PCI Express bus, although any other suitable buses may be used in other embodiments. Thus, bus-bridge 804 can be implemented using a commercially available PCI bridge device or chip set.

In this embodiment, these elements of optical I/O unit 71 are interconnected as follows. Bus bridge 804 is connected to backplane switching fabric 830 to support parallel bidirectional traffic via interconnect 838. Bus bridge 804 is also connected to traffic shaper 824 via an electrical interconnect 839. Electrical interconnects 838, 839 and other signal interconnects in FIG. 8 are depicted as single interconnect wire (even though the connection may include several signal interconnect wires) for clarity.

Traffic shaper 824 is connected to network processor unit 802 and buffer 826 via interconnects 840 and 841, respectively. Network processor unit 802 is connected to queue unit 806 and buffer 820 via interconnects 842 and 843, respectively. Queue unit 806 is in turn connected to PBS framer/de-framer unit 808 via an interconnect 844.

Figure 8A:
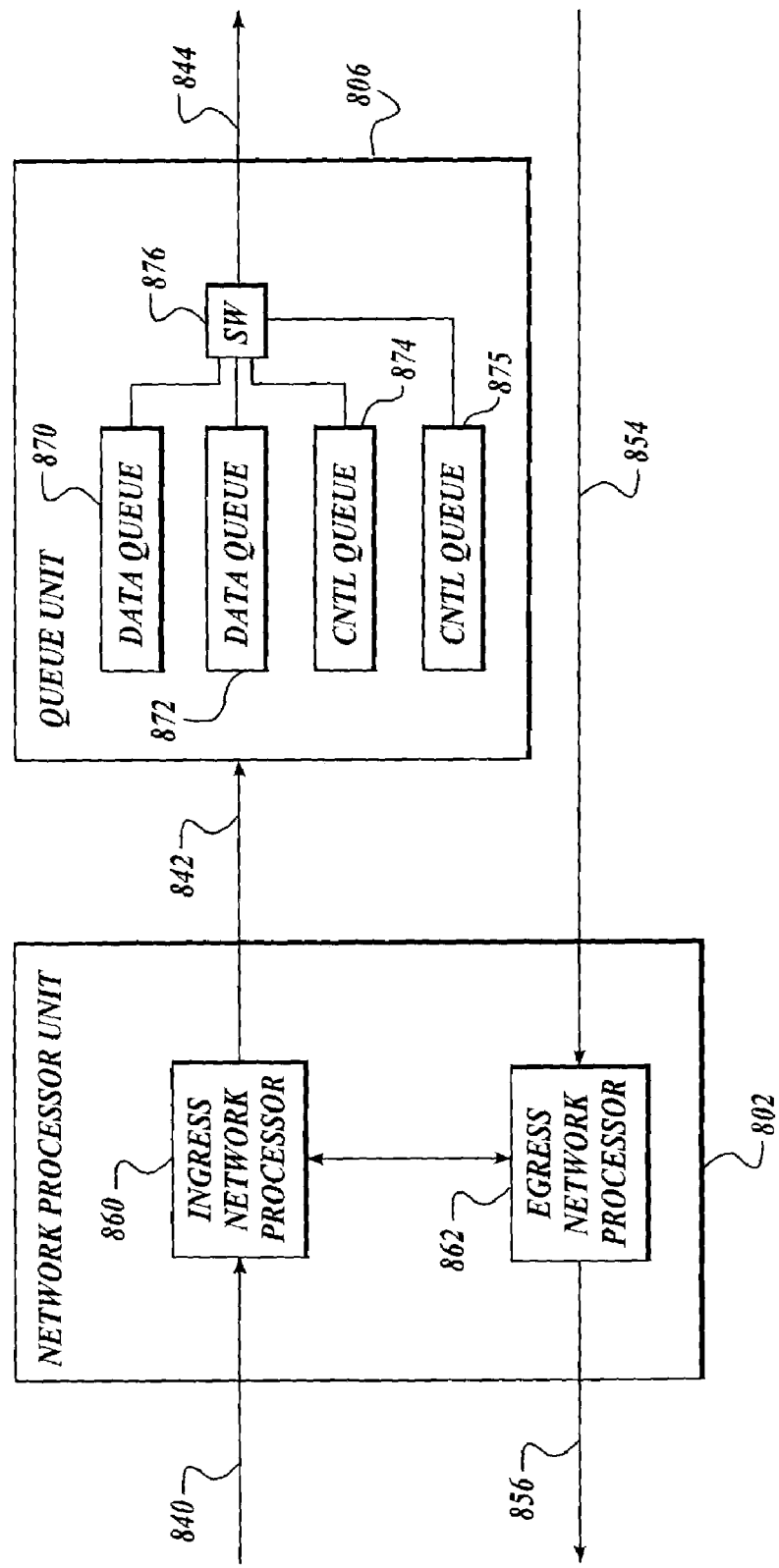
FIG. 8A is a block diagram illustrating in more detail the network processor unit and the queue unit depicted in FIG. 8, according to one embodiment of the present invention.

As shown in FIG. 8A, in some embodiments network processor unit 802 includes an ingress network processor 860 and an egress network processor 862. Thus, in some embodiments of optical I/O module 71, interconnects 840 and 842 are connected to ingress network processor 860.

Further, as shown in FIG. 8A, in some embodiments, queue unit 806 can include data queues 870 and 872, a control queue 874 and an electrical switch or demultiplexer 876 coupled to the output ports of queues 870, 872 and 874. Thus, in some embodiments, the input ports of queues 870, 872 and 874 are connected to interconnect 842 via a switch or multiplexer (not shown). In addition, in some embodiments, the output port of switch 876 can be connected to interconnect 844.

In other embodiments, a different number of processors (e.g., a single processor) can be used in network processor unit 802. Further, in some embodiments, a different number of queues can be used in queue unit 806. For example, queue unit need not include a dedicated control queue and/or two data queues. Multiple queues can be used to provide storage for building multiple bursts with different properties such as different priorities.

Referring again to FIG. 8, PBS framer unit 808 is connected to E-O interface 810 via an interconnect 846. E-O interface 810 is in turn is connected to the rest of PBS network 60 (FIG. 6) via an interconnect 848. O-E interface 816 connected to the rest of PBS network 60 via a interconnect 850. O-E interface 816 is also connected to framer unit 808 via an interconnect 852. Framer unit 808 is also connected to network processor unit 802 via a interconnect 854. In one embodiment, an interconnect 864 is connected to network processor 862 (FIG. 8A). Network processor unit 802 is connected to bus bridge 804 via an interconnect 856. The operation of optical I/O module 71 in transferring information to and from the PBS network is described below in conjunction with FIGS. 9 and 10.

Figure 9:
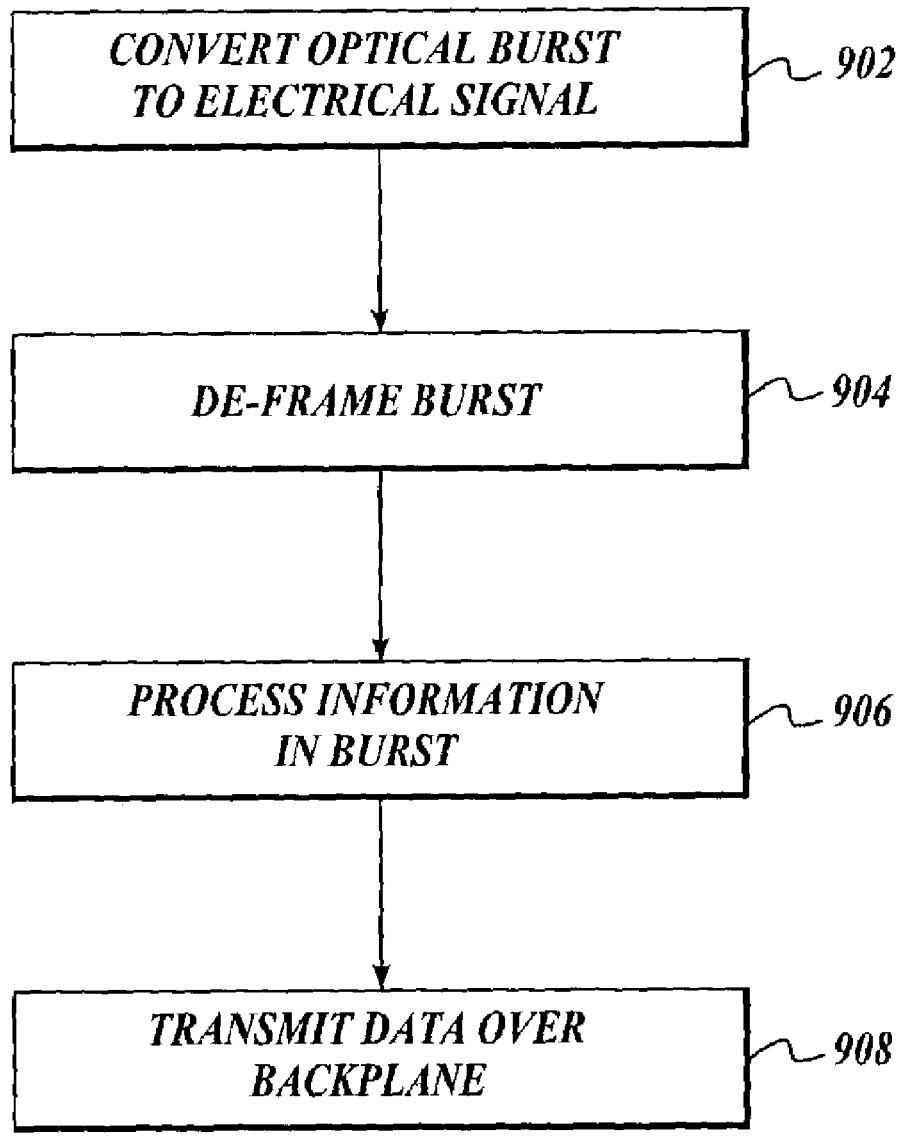
FIG. 9 is a flow diagram illustrating an egress operational flow, according to one embodiment of the present invention.

Referring to FIGS. 8 and 9, optical I/O module 71 performs PBS egress operations (i.e., transferring information from the PBS network to a legacy network and/or server module of unit 70 (FIG. 7) as follows. Optical I/O module 71 converts an optical PBS burst received from the PBS network via an interconnect 850 into electrical signals. In this embodiment, O-E interface 816 performs the O-E conversion. This operational flow is represented by a block 902.

The received O-E converted PBS burst is then de-framed. In this embodiment, framer unit 808 receives the O-E converted PBS burst from O-E interface 816 via interconnect 852 and de-frames the PBS burst. For example, in one embodiment, the PBS burst may be framed as described in aforementioned U.S. patent application Ser. No. 10/377,580. In other embodiments, a different framing format may be used. This operational flow is represented by a block 904.

The information included in the PBS burst is then processed. In this embodiment, network processor unit 802 receives the de-framed PBS burst from framer unit 808 via interconnect 854 and performs the processing. For example, in some embodiments, network processor unit 802 can extract address and payload information, perform error correction on header and/or payload information, concatenate a payload, re-assemble segmented payloads, etc. Network processor unit 802 can use buffer 820 to temporarily store information during the above processing operations. In one embodiment, egress network processor 862 (FIG. 8A) processes the de-framed burst. This operational flow is represented by a block 906.

The processed information is then transmitted over backplane switching fabric 830. In this embodiment, bus bridge 804 receives the processed information from network processor unit 802 via an interconnect 856 and transmits the information over backplane switching fabric 830 to the proper destination, in the proper format, and with proper bus control signals (e.g., according to the PCI protocol). The destination for the information may be, for example, a device connected to the legacy network (in which case the information is transmitted to legacy interface module 73) or a server module (i.e., one of server modules $75_1$-$75_4$). This operational flow is represented by a block 908.

Referring to FIGS. 8 and 10, optical I/O module 71 performs PBS ingress operations; i.e., transferring information to the PBS network from a legacy network and/or server module of unit 70 (FIG. 7) as follows. Optical I/O module 71 receives information to be transmitted over PBS network 60 (FIG. 6) in the form of electrical signals. In this embodiment, bus bridge 804 receives the information from backplane switching fabric via an interconnect 838. In this embodiment, this information can come from the legacy network via legacy interface 73 or from one of server modules $75_1$-$75_4$ (FIG. 7). This operational flow is represented by a block 1002.

The received information is then shaped to help improve traffic flow in PBS network 60 (FIG. 6). In this embodiment, traffic shaper 824 receives the information from bus bridge 804 via interconnect 839 and shapes the information. For example, in one embodiment, traffic shaper 824 performs operations on the information to reduce the correlation structures and long-term dependence of the incoming traffic flows caused by the self-similarity effect. Traffic shaper 824 can be configured to perform any suitable traffic-shaping algorithm or technique known in the art. Traffic shaper 824 can use buffer 826 to temporarily store information while performing traffic shaping operations. This operational flow is represented by a block 904.

The shaped information is then formed into PBS bursts. In this embodiment, network processor unit 802 receives the shaped information from traffic shaper 824 via interconnect 840. Network processor unit 802 then processes the information to form and schedule PBS control and data bursts as described above for ingress nodes in PBS network 10 (FIG. 1). In other embodiments, the information is assembled into any suitable aggregated format to be transmitted over an optical burst network (not necessarily a PBS network). In one embodiment, ingress network processor 860 (FIG. 8A) processes the traffic shaped information. Further, in this embodiment, network processor unit 802 uses queue unit 806 to store the control and data bursts as they are being formed and until they are scheduled for transmission over the PBS network. This operational flow is represented by a block 1006.

The bursts are then encapsulated into frames for transmission over the PBS network. In this embodiment, framer unit 808 receives the bursts from queue unit 806 via interconnect 844 and performs the framing operation. In one embodiment, the bursts are framed as described in aforementioned U.S. patent application Ser. No. 10/377,580. In other embodiments, different framing formats can be used. This operational flow is represented by a block 1008.

The framed bursts are then converted to optical signals and transmitted over the PBS network at the scheduled times. In this embodiment, E-O interface 810 receives the framed bursts (i.e., PBS control and data bursts) from framer unit 808 via interconnect 846. E-O interface 810 then performs the E-O conversion and transmits the optical signals at the scheduled time and in the reserved PBS TDM channel of the PBS network. This operational flow is represented by blocks 1010 and 1012.

Embodiments of method and apparatus for implementing a photonic burst switched network are described herein. In the above description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable optical manner in one or more embodiments.

Thus, embodiments of this invention may be used as or to support software program executed upon some form of processing core (such as the CPU of a computer or a processor of a module) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

In the foregoing specification, embodiments of the invention have been described. It will, however, be evident that various modifications and changes may be made thereto without departing from the broader spirit and scope as set forth in the appended claims. The specification and drawings are, accordingly, to be regarded in an illustrative rather than a restrictive sense.

What is claimed is:

1. A system comprising:
    a backplane including a switching fabric with a wired communication channel, the wired communication channel to provide a medium to propagate information;
    a plurality of configuration unit modules coupled to the wired communication channel to transmit packets over the wired communication channel;
    a legacy interface module coupled to the wired communication channel, the legacy interface module including a port to be coupled to a legacy network; and
    an optical input/output (I/O) module coupled to the wired communication channel, the optical I/O module including a port to be coupled to an optical network, the optical I/O module to aggregate packets received from the wired communication channel into a burst and to optically transmit the burst over the optical network.

2. The system of claim 1 wherein the packets are selected from a group consisting of Internet protocol (IP) packets, Ethernet frames and SONET frames.

3. The system of claim 1 wherein the optical network is a photonic burst switched network.

4. The system of claim 1 wherein the optical I/O module comprises:
    a bus bridge coupled to the wired communication channel to receive packets from the wired communication channel;
    a network processor unit coupled to the bus bridge, the network processor unit to aggregate packets received via the bus bridge into a burst;
    a framer unit coupled to the network processor unit, wherein the framer to encapsulate the burst into an optical network frame; and
    an optical output interface coupled to the framer unit and the optical network, wherein optical output interface to transmit an optical signal including the optical network frame over the optical network.

5. The system of claim 4 wherein the network processing unit to aggregate packets using statistical multiplexing.

6. The system of claim 4 further comprising a traffic shaper coupled to the bus bridge and the network processing unit.

7. The system of claim 4 further comprising a queue unit coupled to the framer unit and the network processing unit, wherein the queue unit to store bursts until they are scheduled to be transmitted over the optical network.

8. The system of claim 4 wherein the network processor unit forms a first burst and a second burst, wherein first burst includes information for routing the second burst through the optical system.

9. The system of claim 4 wherein the optical I/O module further comprises:
    an optical input interface coupled to the framer unit and the optical network, wherein optical input interface to convert an optical burst signal including an optical network frame received from the optical network into an electrical signal including the optical network frame information.

10. The system of claim 9 wherein the framer unit to also de-frame the optical network frame information from the optical input interface.

11. The system of claim 10 wherein the network processor also to process the de-framed information from the framer unit to determine the destination of the information.

12. The system of claim 11 wherein the bus bridge to also transmit packets including the processed information from the network processor to the information's destination over the wired communication channel.

13. The system of claim 1 wherein the plurality of configuration unit modules includes a storage module.

14. The system of claim 1 wherein the plurality of configuration unit modules includes a server module including a server.

15. The system of claim 14 wherein the server module includes a storage unit coupled to the server of the server module.

16. The system of claim 15 wherein the storage unit is coupled to the server via a fiber channel (FC) interface.

17. The system of claim 14 wherein the server module includes a plurality of servers.

18. The system of claim 17 wherein at least one server of the plurality of servers is part of a server cluster.

19. The system of claim 1 wherein the switching fabric comprises an optical switching fabric.

20. The system of claim 1 wherein the switching fabric comprises an electrical switching fabric.

21. The system of claim 1 wherein the plurality of configuration unit modules is reconfigurable.

22. The system of claim 1 wherein the optical network is a wavelength division multiplexed (WDM) network.

23. A method, comprising:
converting an optical burst signal into an electrical burst signal, wherein the optical burst signal is received from an optical network by an edge node system of the optical network, the edge node system including a configuration unit module connected to a backplane that includes a switching fabric with a wired communication channel, wherein the switching fabric comprises at least one of an optical switching fabric or an electrical switching fabric;
processing the electrical burst signal to obtain data and a destination for the data; and
transmitting packets including the processed information to the configuration unit module via the wired communication channel when the destination is the configuration unit module.

24. The method of claim 23 wherein the configuration unit module is part of a plurality of configuration unit modules coupled to the wired communication channel to receive the packets transmitted over the wired communication channel.

25. The method of claim 24 wherein the plurality of configuration unit modules includes a storage module.

26. The method of claim 24 wherein the plurality of configuration unit modules includes a server module including a server.

27. The method of claim 26 wherein the server module includes a plurality of servers.

28. The method of claim 27 wherein at least one server of the plurality of servers is part of a server cluster.

29. The method of claim 26 wherein the server module includes a storage unit coupled to the server of the server module.

30. The method of claim 29 wherein the storage unit is coupled to the server via a fiber channel (FC) interface.

31. The method of claim 24 wherein the plurality of configuration unit modules is reconfigurable.

32. The method of claim 23 wherein the destination is connected to another network coupled to the edge node system.

33. The method of claim 23 wherein the packets are selected from a group consisting of Internet protocol (IP) packets, Ethernet frames and SONET frames.

34. The method of claim 23 wherein the optical network is a photonic burst switched (PBS) network.

35. The method of claim 23 wherein the optical network is a wavelength division multiplexed (WDM) network.

36. A system comprising:
a first network; and
an optical network coupled to the first network, wherein the optical network comprises a photonic burst switched network, the optical network further comprising an edge node that includes:
a backplane including a switching fabric with a wired communication channel, wherein the wired communication channel to provide a medium to propagate information;
a configuration unit module coupled to the wired communication channel to transmit packets over the wired communication channel;
a legacy interface module coupled to the wired communication channel, the legacy interface module including a port to be coupled to a legacy network; and
an optical input/output (I/O) module coupled to the wired communication channel, the optical I/O module including a port to be coupled to the optical network, the optical I/O module to aggregate packets received from the wired communication channel into a burst and to optically transmit the burst over the optical network.

37. The system of claim 36 wherein the configuration unit module is one of a plurality of configuration unit modules coupled to the wired communication channel to transmit packets over the wired communication channel.

38. The system of claim 37 wherein the plurality of configuration unit modules includes a storage module.

39. The system of claim 37 wherein the plurality of configuration unit modules includes a server module including a server.

40. The system of claim 39 wherein the server module includes a plurality of servers.

41. The system of claim 40 wherein at least one server of the plurality of servers is part of a server cluster.

42. The system of claim 39 wherein the server module includes a storage unit coupled to the server of the server module.

43. The system of claim 42 wherein the storage unit is coupled to the server via a fiber channel (FC) interface.

44. The system of claim 37 wherein the plurality of configuration unit modules is reconfigurable.

45. The system of claim 36 wherein the packets are selected from a group consisting of Internet protocol (IP) packets and Ethernet frames.

46. The system of claim 36 wherein the optical I/O module comprises:
a bus bridge coupled to the wired communication channel to receive packets from wired communication channel;
a network processor unit coupled to the bus bridge, wherein the network processor unit to aggregate packets received via the bus bridge into a burst;
a framer unit coupled to the network processor unit, wherein the framer to encapsulate the burst into an optical network frame; and
an optical output interface coupled to the framer unit and the optical network, wherein optical output interface to transmit an optical signal including the optical network frame over the optical network.

47. The system of claim 46 wherein the network process unit is to aggregate packets using statistical multiplexing.

48. The system of claim 46 further comprising a traffic shaper coupled to the bus bridge and the network processing unit.

49. The system of claim 46 further comprising a queue unit coupled to the framer unit and the network processing unit, wherein the queue unit to store bursts until they are scheduled to be transmitted over the optical network.

50. The system of claim 46 wherein the network processor unit forms a first burst and a second burst, wherein first burst includes information for routing the second burst through the optical system.

51. The system of claim 46 wherein the optical I/O module further comprises:
an optical input interface coupled to the framer unit and the optical network, wherein optical input interface to convert an optical burst signal including an optical network frame received from the optical network into an electrical signal including the optical network frame information.

52. The system of claim 51 wherein the framer unit to also de-frame the optical network frame information from the optical input interface.

53. The system of claim 52 wherein the network processor also to process the de-framed information from the framer unit to determine the destination of the information.

54. The system of claim 53 wherein the bus bridge to also transmit packets including the processed information from the network processor to the information's destination over the wired communication channel.

55. The system of claim 36 wherein the switching fabric comprises an optical switching fabric.

56. The system of claim 36 wherein the switching fabric comprises an electrical switching fabric.

57. The system of claim 36 wherein the optical network is a wavelength division multiplexed (WDM) network.

58. A method of operation of an edge node apparatus of an optical network to transfer information, the method comprising:
receiving packets at an optical input/output ("I/O") module of the edge node apparatus from a plurality of configuration unit modules of the edge node apparatus, wherein the packets are received via a backplane including a switching fabric having a wired communication bus communicatively coupling the I/O module to the configuration unit modules;
selectively aggregating the packets received via the backplane from the plurality of configuration unit modules into a burst; and
optically transmitting the burst over the optical network.

59. The method of claim 58 wherein the packets are received from another network connected to the edge node apparatus.

60. The method of claim 58 wherein the packets are selected from a group consisting of Internet protocol (IP) packets and Ethernet frames, Ethernet frames and SONET frames.

61. The method of claim 58 wherein aggregating received packets comprises forming a first burst and a second burst, the first burst including information for routing the second burst through the optical network.

62. The method of claim 58 wherein the plurality of configuration unit modules includes a storage module.

63. The method of claim 58 wherein the plurality of configuration unit modules includes a server module including a server.

64. The method of claim 63 wherein the server module includes a plurality of servers.

65. The method of claim 64 wherein at least one server of the plurality of servers is part of a server cluster.

66. The method of claim 63 wherein the server module includes a storage unit coupled to the server of the server module.

67. The method of claim 66 wherein the storage unit is coupled to the server via a fiber channel (FC) interface.

68. The method of claim 58 wherein the switching fabric comprises an optical switching fabric.

69. The method of claim 58 wherein the switching fabric comprises an electrical switching fabric.

70. The method of claim 58 wherein the plurality of configuration unit modules is reconfigurable.

71. The method of claim 58 wherein the optical network is a wavelength division multiplexed (WDM) network.

* * * * *